(12) United States Patent
Ke et al.

(10) Patent No.: US 11,503,100 B2
(45) Date of Patent: Nov. 15, 2022

(54) METHOD FOR SUPPORTING QUALITY OF SERVICE OF TIME-SENSITIVE COMMUNICATION AND COMMUNICATION DEVICE

(71) Applicant: VIVO MOBILE COMMUNICATION CO., LTD., Guangdong (CN)

(72) Inventors: Xiaowan Ke, Guangdong (CN); Yanxia Zhang, Guangdong (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 0 days.

(21) Appl. No.: 17/372,572

(22) Filed: Jul. 12, 2021

(65) Prior Publication Data

US 2021/0344735 A1    Nov. 4, 2021

Related U.S. Application Data

(63) Continuation of application No. PCT/CN2020/071505, filed on Jan. 10, 2020.

(30) Foreign Application Priority Data

Jan. 11, 2019    (CN) .......................... 201910028865.1

(51) Int. Cl.
*H04L 65/80* (2022.01)
*H04W 28/08* (2009.01)
*H04W 28/02* (2009.01)

(52) U.S. Cl.
CPC ......... *H04L 65/80* (2013.01); *H04W 28/0268* (2013.01)

(58) Field of Classification Search
CPC .......................... H04L 65/80; H04W 28/0268
See application file for complete search history.

(56) References Cited

U.S. PATENT DOCUMENTS

| | | | |
|---|---|---|---|
| 10,142,889 B2 | 11/2018 | Dao | |
| 2007/0038751 A1 | 2/2007 | Jorgensen | |
| 2017/0344506 A1 | 11/2017 | Park et al. | |
| 2018/0035392 A1 | 2/2018 | Patel et al. | |
| 2018/0237040 A1 | 8/2018 | Mong et al. | |
| 2018/0316557 A1* | 11/2018 | Frangieh | ............. H04L 41/0806 |

(Continued)

FOREIGN PATENT DOCUMENTS

| | | |
|---|---|---|
| CN | 101175039 A | 5/2008 |
| CN | 107436855 A | 12/2017 |

(Continued)

OTHER PUBLICATIONS

Chinese Office Action for Application No. 201910028865.1, dated Feb. 26, 2021.

(Continued)

*Primary Examiner* — Suraj M Joshi
(74) *Attorney, Agent, or Firm* — Price Heneveld LLP

(57) ABSTRACT

The embodiments of the present disclosure provide a method for supporting quality of service of time-sensitive communication and a communication device. The method includes: obtaining first information, where the first information includes at least one of the following: transfer configuration information of a time-sensitive data stream, or bridge capability information; and performing a first operation according to the first information.

20 Claims, 10 Drawing Sheets

(56) References Cited

U.S. PATENT DOCUMENTS

2019/0253339 A1* 8/2019 Mehmedagic .......... H04L 45/64
2020/0344740 A1* 10/2020 Park ...................... H04L 65/602
2021/0204172 A1* 7/2021 Rost ...................... H04W 28/10

FOREIGN PATENT DOCUMENTS

| CN | 108809852 A | 11/2018 |
| CN | 109041111 A | 12/2018 |
| WO | 2018015425 A1 | 1/2018 |

OTHER PUBLICATIONS

Written Opinion and International Search Report for International Application No. PCT/CN2020/071505, dated Jul. 22, 2021.
Nokia, "TSN—QoS framework Solution Update," ISA WG2 Meeting #129bis S2-1811831 Nov. 26-30, 2018, West Palm Beach, FL (7 pages).
Huawei, "Updates on Solution #18," 3GPP TSG-SA WG2 Meeting #129Bis S2-1812232, West Palm Beach, USA Nov. 26-30, 2018 (8 pages).

* cited by examiner

METHOD FOR SUPPORTING QUALITY OF SERVICE OF TIME-SENSITIVE COMMUNICATION AND COMMUNICATION DEVICE

CROSS-REFERENCE OF RELATED APPLICATION

This application is a continuation application of International Application No. PCT/CN2020/071505 filed on Jan. 10, 2020, which claims priority to Chinese Patent Application No. 201910028865.1 filed in China on Jan. 11, 2019, both disclosures of which are incorporated herein by reference in their entireties.

TECHNICAL FIELD

Embodiments of the present disclosure relate to the field of communications technologies, and in particular, to a method for supporting quality of service of time-sensitive communication and a communication device.

BACKGROUND

Many vertical industries all have requirements for time-sensitive communication. In the industrial Internet, there is time-sensitive data, such as a robot instruction, that needs to be sequentially executed within a specified time. However, a network transmission resource is shared, and data transmission has delay and jitter and cannot support time-sensitive data.

A wireless communication network can be a transmission medium in a time-sensitive network. However, how to support quality of service of time-sensitive communication in the wireless communication network is an urgent technical problem that needs to be solved currently.

SUMMARY

Based on the first aspect of the embodiments of the present disclosure, a method for supporting quality of service of time-sensitive communication is provided, applied to a first communication device, including:
obtaining first information, where the first information includes at least one of the following: transfer configuration information of a time-sensitive data stream, or bridge capability information; and
performing a first operation according to the first information.

Based on the second aspect of the embodiments of the present disclosure, a method for supporting quality of service of time-sensitive communication is further provided, applied to a second communication device, including:
obtaining first QoS-related information, first container information, and/or transfer configuration information of a time-sensitive data stream; and
sending the first QoS-related information, the first container information, and/or the transfer configuration information of the time-sensitive data stream to a second target end;
where the first container information includes the transfer configuration information of the time-sensitive data stream or an SRP message; and the SRP message includes the transfer configuration information of the time-sensitive data stream.

Based on the third aspect of the embodiments of the present disclosure, a method for supporting quality of service of time-sensitive communication is further provided, applied to a third communication device, including:
obtaining first QoS-related information, first container information, and/or transfer configuration information of a time-sensitive data stream, where the first container information includes the transfer configuration information of the time-sensitive data stream or an SRP message; and the SRP message includes the transfer configuration information of the time-sensitive data stream; and
performing a second operation according to the first QoS-related information, the first container information, and/or the transfer configuration information of the time-sensitive data stream.

Based on the fourth aspect of the embodiments of the present disclosure, a method for supporting quality of service of time-sensitive communication is further provided, applied to a fourth communication device, including:
determining first QoS-related information, where the first QoS-related information includes at least one of the following: a transfer interval, information related to a data sending interval, a first GBR-related parameter, first maximum data burst, first delay budget information, a maximum packet size, a maximum number of packets sent in a data sending interval, packet filter information, or information indicating whether it is time-sensitive; and
sending the first QoS-related information to a third target end.

Based on the fifth aspect of the embodiments of the present disclosure, a first communications device is further provided, including:
a first obtaining module, configured to obtain first information, where the first information includes at least one of the following: transfer configuration information of a time-sensitive data stream, or bridge capability information; and
a first processing module, configured to perform a first operation according to the first information.

Based on the sixth aspect of the embodiments of the present disclosure, a second communications device is further provided, including:
a second obtaining module, configured to obtain first QoS-related information, first container information, and/or transfer configuration information of a time-sensitive data stream; and
a first sending module, configured to send the first QoS-related information, the first container information, and/or the transfer configuration information of the time-sensitive data stream to a second target end.

Based on the seventh aspect of the embodiments of the present disclosure, a third communications device is further provided, including:
a receiving module, configured to obtain first QoS-related information, first container information, and/or transfer configuration information of a time-sensitive data stream, where the first container information includes the transfer configuration information of the time-sensitive data stream or an SRP message; and the SRP message includes the transfer configuration information of the time-sensitive data stream; and
a second processing module, configured to perform a second operation according to the first QoS-related information, the first container information, and/or the transfer configuration information of the time-sensitive data stream.

Based on the seventh aspect of the embodiments of the present disclosure, a fourth communications device is further provided, including:
a first determining module, configured to determine first QoS-related information, where the first QoS-related information includes at least one of the following: a transfer interval, information related to a data sending interval, a first GBR-related parameter, first maximum data burst, first delay budget information, a maximum packet size, a maximum number of packets sent in a data sending interval, packet filter information, or information indicating whether it is time-sensitive; and a second sending module, configured to send the first QoS-related information to a third target end.

Based on the eighth aspect of the embodiments of the present disclosure, a communications device is further provided, including: a processor, a memory, and a program stored in the memory and executable on the processor. The program, when executed by the processor, implements the steps of the foregoing method for supporting quality of service of time-sensitive communication.

Based on the ninth aspect of the embodiments of the present disclosure, a computer-readable storage medium is further provided, where the computer-readable storage medium stores a computer program, and the computer program, when executed by a processor, implements the steps of the foregoing method for supporting quality of service of time-sensitive communication.

BRIEF DESCRIPTION OF DRAWINGS

It becomes clear for a person of ordinary skill in the art to learn various other advantages and benefits by reading detailed description of the following optional implementation manners. Accompanying drawings are merely used for showing the optional implementation manners, and are not considered as a limitation on the present disclosure. In addition, in all the accompanying drawings, same reference numerals are used to indicate the same component. In the accompanying drawings.

DETAILED DESCRIPTION OF EMBODIMENTS

Figure 1:
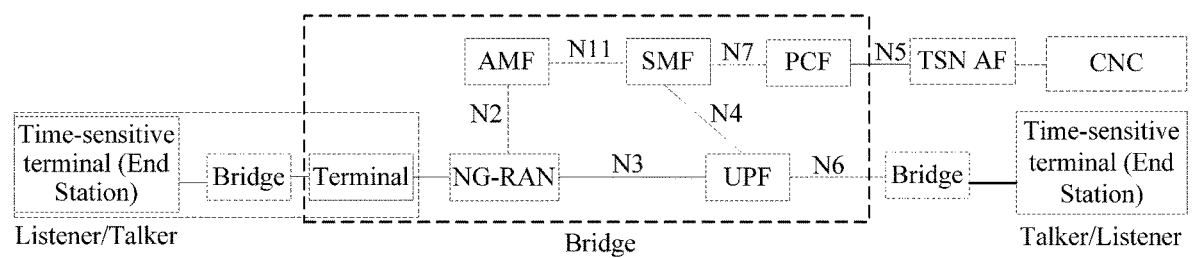
FIG. 1 is a schematic architectural diagram of a wireless communications system according to an embodiment of the present disclosure.

The following clearly describes the technical solutions in the embodiments of the present disclosure with reference to the accompanying drawings in the embodiments of the present disclosure. Apparently, the described embodiments are some rather than all of the embodiments of the present disclosure. All other embodiments obtained by a person of ordinary skill in the art based on the embodiments of the present disclosure shall fall within the protection scope of the present disclosure.

The term "include" and any other variants in the specification and claims of this application mean to cover the non-exclusive inclusion, for example, a process, method, system, product, or device that includes a list of steps or units is not necessarily limited to those clearly listed steps or units, but may include other steps or units not clearly listed or inherent to such a process, method, product, or device. In addition, "and/or" used in the specification and claims means at least one of the connected objects. For example, A and/or B represents the following three cases: Only A exists, only B exists, and both A and B exist.

In the embodiments of the present disclosure, the word such as "exemplary" or "example" is used to represent giving an example, an illustration, or a description. Any embodiment or design scheme described as "exemplary" or "for example" in the embodiments of this disclosure should not be construed as being more preferred or advantageous than other embodiments or design schemes. To be precise, the use of the term such as "exemplary" or "for example" is intended to present a related concept in a specific manner.

Many vertical industries all have requirements for time-sensitive communication. In the industrial Internet, there is time-sensitive data, such as a robot instruction, that needs to be sequentially executed within a specified time. However, a network transmission resource is shared, and data transmission has delay and jitter and cannot support time-sensitive data. Therefore, a time-sensitive network is proposed to support transmission of time-sensitive data.

The time-sensitive network divides time into intervals, which can be referred to as sliding windows. A traffic specification of the time-sensitive data stream is defined in each sliding window, and a transmission resource is reserved in advance. In this way, when the sliding window for transmitting data arrives, even if there is no time-sensitive data stream, a network resource cannot be occupied by another data stream. When the time-sensitive data stream arrives, a dedicated resource is occupied for transmission.

A transmit end of the time-sensitive data stream is referred to as a talker, and a receive end of the time-sensitive data stream is referred to as a listener. One or multiple bridges are used between the talker and the listener for data forwarding.

A transmission medium of the talker, the listener, or the bridge may be wireless connection. Therefore, the wireless communication network can be a transmission medium in a time-sensitive network. How to support quality of service of time-sensitive communication in the wireless communication network is an urgent technical problem that needs to be solved currently.

In the embodiments of the present disclosure, time-sensitive can also be referred to as periodic deterministic. Time-sensitive communication can also be referred to as periodic deterministic communication. The time-sensitive data stream can also be referred to as a periodic deterministic data stream. An example of a time-sensitive network technology is IEEE TSN (Time Sensing Network). Periodic deterministic communication uses a transfer interval as a period for data transmission.

In the embodiments of the present disclosure, the transfer configuration information of the time-sensitive data stream can include user and/or network configuration information. The user and/or network configuration information is used to configure sending of the time-sensitive data stream. The user and/or network configuration information can be user and/or network configuration information in IEEE 802.1Q series. The user and/or network configuration information can include at least one of the following: listener group, talker group, or traffic specification.

FIG. 1 is a schematic structural diagram of a wireless communications system according to an embodiment of the present disclosure.

The figure shows a next-generation RAN (NG-RAN), a user plane function (UPF), a session management function (SMF), a policy control function (PCF), time-sensitive networking (TSN), an application function (AF), and a centralized network configuration (CNC) function.

A transmit end of the time-sensitive data stream is referred to as a talker, and a receive end of the time-sensitive data stream is referred to as a listener. One or multiple bridges are used between the talker and the listener for data forwarding. End Station can be talker or listener. Bridge is responsible for data transmission between talker and listener.

A terminal and a wireless communication network form a bridge. For downlink data, the terminal is a bridge exit, and a user plane function (UPF) is a bridge entrance. For uplink data, the terminal is a bridge entrance, and the UPF is a bridge exit.

It should be noted that the terminal can be co-located with the End Station, or the terminal can be co-located with the bridge. The terminal can be connected to the bridge or the terminal can also be connected to the End Station.

For a centralized architecture, the wireless communication network can obtain user and/or network configuration information through a CNC and an AF. For a distributed architecture, the wireless communication network can receive previous-hop user and/or network configuration information from the bridge entrance, and then generate user and/or network configuration information of the current bridge.

In an embodiment of the present disclosure, the bridge formed by the terminal and the wireless communication network can be shortly referred to as the bridge formed by the terminal and the network.

In an embodiment of the present disclosure, the transfer interval can be referred to as a transfer period.

Figure 2:
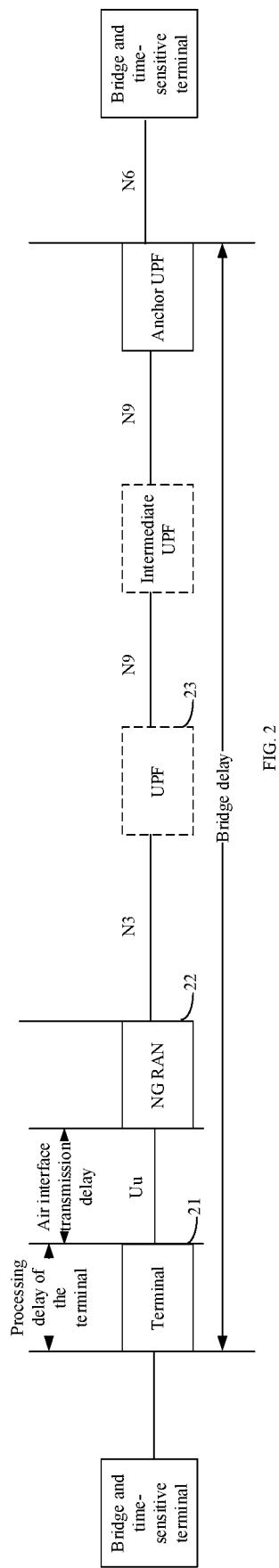
FIG. 2 is a schematic composition diagram of a bridge delay.

FIG. 2 is a schematic composition diagram of a bridge delay.

FIG. 2 includes a terminal 21, a radio access network (RAN) network element 22, and a gateway UPF 23, where the UPF 23 may be one or more UPFs. There may be zero or multiple UPFs between the RAN network element 22 and the anchor UPF, that is, there may be no other UPF between the RAN network element 22 and the anchor UPF.

Figure 3:
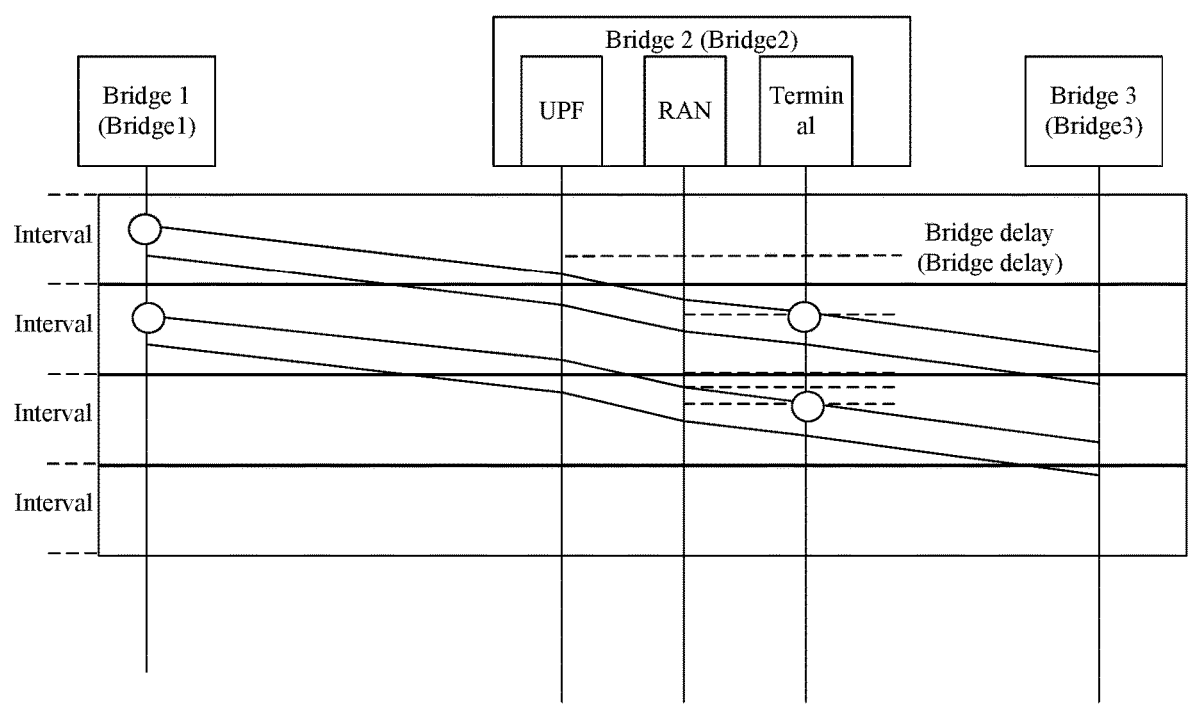
FIG. 3 is a schematic diagram of transmission of a time-sensitive data stream in a bridge.

FIG. 3 is a schematic diagram of transmission of a time-sensitive data stream in a bridge.

To support quality of service of time-sensitive communication, the following problems can be further solved:

Problem 1: to support time-sensitive data, a guaranteed bitrate (GBR) and a maximum burst data volume in existing QoS are based on full duration. However, transmission of time-sensitive data is based on segments. Therefore, the existing GBR is not suitable for transmission of time-sensitive data. When one or more time-sensitive data streams are mapped to one QoS stream, how to set the GBR and the maximum burst data volume of a data sending interval is unclear.

In addition, because a delay requirement of the time-sensitive data is at the nanosecond level, and the current delay of the wireless communication network is at the millisecond level or 0.5 milliseconds, the precision cannot meet the requirement.

Existing packet delay budget (PDB) is the maximum packet delay budget for the terminal and the UPF. However, the RAN network element requires delay budget for the terminal and the RAN network element.

Problem 2: In the RAN network element, resource scheduling is based on the granularity of a data radio bearer (DRB). To support time-sensitive data communication, resource reservation needs to be performed in advance. For time-sensitive data streams with different traffic specification elements (For example, traffic specifications in the IEEE 802.1Q series), if the multiple time-sensitive data streams are mapped to one QoS stream, the traffic specification requirement cannot be met. Listener may be connected to different terminals, and when data reaches the anchor UPF, multiple QoS streams need to be established and are connected to multiple terminals. For each QoS stream, an independent DRB needs to be mapped to truly ensure resource reservation.

Problem 3: A quality of service requirement of a time-sensitive data stream is a traffic specification (such as a traffic specification in IEEE 802.1Q series) in user and/or network configuration information. Whether the requirement can be met requires the bridge to allocate a resource and return a success or failure response. Whether the bridge formed by the terminal and the wireless communication network can meet the quality of service requirement of the time-sensitive data stream is based on whether a data channel between a terminal and an anchor gateway (for example, UPF) can be established. The data channel is used to carry the sensitive data stream. Whether the data channel can be established depends on two aspects: a) Whether the QoS requirement of the wireless communication network for mapping the quality of service of the time-sensitive data stream can be met, and b) whether the communication device used as the exit of the bridge can meet the quality of service requirement of the time-sensitive data stream. How to support transmission of user and/or network configuration information during establishment of the QoS stream still needs to be resolved.

It should be noted that in the embodiments of the present disclosure, obtaining may be understood as obtaining from a configuration, obtaining through receiving, obtaining after receiving by using a request, obtaining through self-learning, obtaining through derivation based on information that is not received, or obtaining after processing based on received information. This may be specifically determined based on an actual requirement, and is not limited in the embodiments of the present invention. For example, when specific capability indication information sent by a device is not received, it may be deduced that the device does not support the capability.

It should be noted that in the embodiments of the present disclosure, sending may include broadcasting, broadcasting in a system message, and returning after responding to a request.

It should be noted that the quality of service QoS stream to which the time-sensitive data stream is mapped refers to that the time-sensitive data stream is carried and transmitted through the QoS stream.

In an optional embodiment of the present disclosure, a channel can include at least one of the following: a PDU session, a quality of service (QoS) stream, an evolved packet system (EPS) bearer, PDP context, a DRB, an SRB, or Internet Protocol Security (IPsec) association.

In an embodiment of the present disclosure, QoS parameter information can include at least one of the following: QoS level indication information, priority information, packet delay budget, a packet bit error rate, maximum data burst, whether it is GBR, whether it has a default average window requirement, a default average window, or GBR-related QoS parameter information.

In the embodiments of the present disclosure, the wireless communication network may be at least one of the following: a public network or a non-public network.

In the embodiments of the present disclosure, a non-public network is short for a non-public network. The non-public network may be referred to as one of the following: a non-public communication network. The non-public network may include at least one of the following deployment manners: a physical non-public network, a virtual non-public network, or a non-public network implemented in the public network. In an implementation, the non-public network is a closed access group (CAG). One CAG may include a group of terminals.

In the embodiments of the present invention, the non-public network may include or be referred to as a private network. The private network may be referred to as one of the following: a private communication network, a private network, a local area network (LAN), a private virtual network (PVN), an isolated communication network, a dedicated communication network, or another name. It should be noted that a naming manner is not specifically limited in the embodiments of the present disclosure.

In the embodiments of the present disclosure, a public network is short for a public network. The public network may be referred to as one of the following: a public communication network or another name. It should be noted that a naming manner is not specifically limited in the embodiments of the present disclosure.

In an embodiment of the present disclosure, a data packet size can be referred to as a data packet length.

In an embodiment of the present disclosure, a data packet may be referred to as a data frame.

In an embodiment of the present disclosure, the communication device may include at least one of the following: a communication network element or a terminal.

In the embodiments of the present disclosure, a communication network element may include at least one of the following: a core network network element or a wireless access network network element.

In the embodiments of the present disclosure, the core network network element (CN network element) may include but is not limited to at least one of the following: a core network device, a core network node, a core network function, a core network network element, a mobility management entity (MME), an access management function (AMF), a session management function (SMF), a user plane function (UPF), a serving gateway (SGW), a PDN gateway (PDN gateway), a policy control function (PCF), a policy and charging rules function (PCRF) unit, a serving GPRS support node (SGSN), a gateway GPRS support node (GGSN), or a radio access network device.

In the embodiments of the present disclosure, the RAN network element may include but is not limited to at least one of the following: a radio access network device, a radio access network node, a radio access network function, a radio access network unit, a 3GPP radio access network, a non-3GPP radio access network, a centralized unit (CU), a distributed unit (DU), a base station, an evolved NodeB (eNB), a 5G base station (gNB), a radio network controller (RNC), a NodeB, a non-3GPP interworking function (N3IWF), an access controller (AC) node, an access point (AP) device, a wireless local area network (WLAN) node, or N3IWF.

The base station may be a base transceiver station (BTS) in a global system for mobile communication (GSM) or a code division multiple access (CDMA) network, may be a NodeB in wideband code division multiple access (WCDMA), or may be an evolved NodeB (eNB or e-NodeB, evolutional NodeB) in LTE and 5G gNB.

In the embodiments of the present disclosure, the terminal may include a relay that supports a terminal function and/or a terminal that supports a relay function. The terminal may also be referred to as a terminal device or user equipment (UE). The terminal may be a terminal side device such as a mobile phone, a tablet personal computer, a laptop computer, a personal digital assistant (PDA), a mobile internet device (MID), a wearable device, or an in-vehicle device. It should be noted that a specific type of the terminal is not limited in the embodiments of the present disclosure.

The embodiments of the present disclosure are described below with reference to the accompanying drawings. The method for supporting quality of service of time-sensitive communication and the communication device provided in the embodiments of the present disclosure may be applied to a wireless communications system. The wireless communications system may be a 5G system, an evolved Long Term Evolution (eLTE) system, or a subsequent evolved communications system.

The following describes the method for supporting quality of service of time-sensitive communication in the embodiments of the present disclosure.

Figure 4:
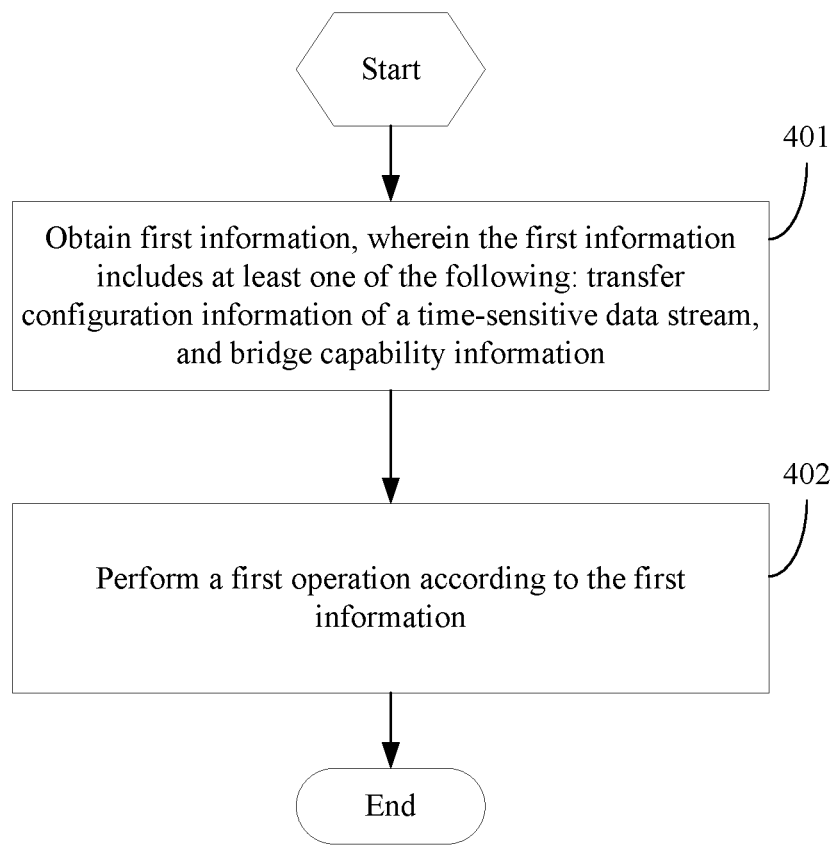
FIG. 4 is a schematic flowchart of a method for supporting quality of service of time-sensitive communication according to an embodiment of the present disclosure.

Referring to FIG. 4, the embodiments of the present disclosure further provide a method for supporting quality of service of time-sensitive communication, applied to a first communication device. The first communication device may include but is not limited to one of the following: a PCF and an SMF. The method may include step 401 to step 402.

Step 401: Obtain first information, where the first information may include at least one of the following: transfer configuration information of a time-sensitive data stream, or bridge capability information.

Step 402: Perform a first operation according to the first information.

In the embodiments of the present disclosure, optionally, the transfer configuration information of the time-sensitive data stream can include user and/or network configuration information.

In the embodiments of the present disclosure, optionally, the transfer configuration information of the time-sensitive data stream may include at least one of the following: a transfer interval, a maximum frame size, a maximum number of frames sent within the transfer interval, an earliest data sending start time offset within the transfer interval, a latest data sending start time offset within the transfer interval, or jitter time.

Further, the transfer configuration information of the time-sensitive data stream can be:

(1) the transfer configuration information of the time-sensitive data stream that is received, that is, what is received is what is obtained; or (2) the transfer configuration information of the time-sensitive data stream is generated according to the transfer configuration information of the time-sensitive data stream in a stream reservation protocol (SRP) message received.

It is not difficult to understand that in a centralized architecture, the transfer configuration information of the time-sensitive data stream of the bridge formed by the terminal and the wireless communication network is configured centrally. In a distributed architecture, the transfer configuration information of the time-sensitive data stream of the bridge formed by the terminal and the wireless communication network is generated after receiving the SRP message.

In the embodiments of the present disclosure, optionally, the bridge capability information may be capability information of the bridge formed by the terminal and the wireless communication network (for example, 3GPP). Further, the bridge capability information may include: a bridge delay.

Further, the bridge delay can include: a bridge delay of the terminal (as shown in FIG. 2), a transmission delay between the terminal and the RAN, a transmission delay between the RAN and the anchor UPF, and a bridge delay of the anchor UPF.

In this embodiment of the present disclosure, optionally, the first operation may include at least one of the following:

determining a QoS stream (a first QoS stream) to which the time-sensitive data stream is mapped;

determining first QoS-related information of a first QoS stream, where the first QoS stream is a QoS stream to which the time-sensitive data stream is mapped;

determining an indicator indicating whether to map an independent bearer resource (for example, a DRB); or determining configuration information of the time-sensitive data stream (for example, user and/or network configuration information).

(1) In the embodiments of the present disclosure, optionally, the determining the QoS stream to which the time-sensitive data stream is mapped may be determining the QoS stream that carries the time-sensitive data stream. In the embodiments of the present disclosure, optionally, the determining, according to the first information, a QoS stream to which the time-sensitive data stream is mapped may include at least one of the following:

when a first condition is satisfied, mapping multiple time-sensitive data streams to a same QoS stream;

when a second condition is satisfied, mapping different time-sensitive data streams to different QoS streams; or mapping each time-sensitive data stream to an independent QoS stream.

Further, the first condition may include at least one of the following: multiple time-sensitive data streams have a same transfer interval (such as an interval in IEEE801.1Qcc);

multiple time-sensitive data streams have the same data sending start time;

multiple time-sensitive data streams have the same traffic specification (traffic specification, such as a traffic specification in IEEE801.1Qcc); or listeners of the multiple time-sensitive data streams are connected to a same terminal.

Further, the second condition may include at least one of the following:

multiple time-sensitive data streams have different transfer intervals;

multiple time-sensitive data streams have different data sending start time;

multiple time-sensitive data streams have different service traffic specifications; or listeners of the multiple time-sensitive data streams are connected to different terminals.

(2) In the embodiments of the present disclosure, optionally, the first QoS-related information may include at least one of the following: a transfer interval, information related to a data sending interval, a first GBR-related parameter, first maximum data burst, first delay budget information, a maximum packet size, a maximum number of packets sent in a data sending interval, packet filter information, or information indicating whether it is time-sensitive; and (2.1) In the embodiments of the present disclosure, optionally, the determining information related to a data sending interval according to the first information may include: determining the information related to the data sending interval according to at least one of the transfer interval, the earliest data sending start time offset within the transfer interval, the latest data sending start time offset within the transfer interval, or the jitter time in the transfer configuration information of the time-sensitive data stream and/or the bridge capability information.

Further, the information related to the data sending interval may include at least one of the following: an earliest data sending start time within the transfer interval, a latest data sending start time within the transfer interval, a data sending start time within the transfer interval, a data sending end time within the transfer interval, an earliest data sending start time offset within the transfer interval, or a latest data sending start time offset within the transfer interval.

(2.2) In an embodiment of the present disclosure, optionally, the determining the first GBR-related parameter according to the first information may include: determining the first GBR-related parameter according to at least one of the transfer interval, the maximum frame size, the maximum number of frames sent within the transfer interval, the earliest data sending start time offset within the transfer interval, the latest data sending start time offset within the transfer interval, or the jitter time in the transfer configuration information of the time-sensitive data stream and the information related to the data sending interval (referring to descriptions in 2.1). The first GBR-related parameter can also be referred to as a GBR-related parameter of a data sending interval.

In an implementation, the GBR (GFBR or MFBR) of the data sending interval is set to the maximum data packet size×the maximum number of packets sent in the transfer interval/the first time interval.

Further, the first time interval may include at least one of the following:

a transfer interval;

a transfer interval end time (or the data sending end time in the transfer interval) minus the data sending start time in the transfer interval;

a transfer interval end time (or the data sending end time in the transfer interval) minus the earliest data sending start time in the transfer interval; or a transfer interval end time (or the data sending end time in the transfer interval) minus the latest data sending start time in the transfer interval.

(2.3) In an embodiment of the present disclosure, optionally, the determining a first maximum data burst according to the first information includes: determining the maximum data burst according to the maximum frame size and/or the maximum number of frames sent within the transfer interval in the transfer configuration information of the time-sensitive data stream.

In an implementation, the maximum data burst is set as the maximum frame size×the maximum number of frames sent within the transmission interval. In this case, the first maximum data burst may be understood as the maximum data burst in the data sending interval.

(2.4) In an embodiment of the present disclosure, optionally, the determining the first delay according to the first information includes: determining delay information between the terminal and a RAN network element according to at least one of a confirmed latest data sending time within the transfer interval (refer to descriptions in 2.1), a delay between the RAN network element and an anchor UPF, or a processing delay of the terminal.

In an implementation, the first delay is the delay between the terminal and the RAN network element.

For example:

Downlink: the delay between the terminal and the RAN network element=the latest data transmission time-the delay between the RAN network element and the anchor UPF-the bridge delay of the terminal-the bridge delay of the anchor UPF;

Uplink: the delay between the terminal and the RAN network element=the latest data transmission time-the delay between the RAN network element and the anchor UPF-the bridge delay of the terminal-the bridge delay of the anchor UPF.

(2.5) In an embodiment of the present disclosure, optionally, the maximum packet size is the maximum frame size of the time-sensitive data stream. When the QoS stream is mapped to multiple time-sensitive data streams, the maximum packet size is the maximum frame size of the multiple time-sensitive data streams.

In an embodiments of the present disclosure, optionally, the maximum number of packets sent in the data sending interval is the maximum number of frames sent in the transfer interval of the time-sensitive data stream. When the QoS stream is mapped to multiple time-sensitive data streams, the maximum number of packets sent in the data sending interval is the sum of the maximum numbers of frames sent in the multiple time-sensitive data streams in the same transfer interval.

(2.6) In an embodiment of the present disclosure, optionally, the determining packet filter information according to the first information includes: the packet filter information of the first QoS stream includes the data frame specification (Data Frame Specification, such as the data frame specification in the IEEE 802.1Q series) of the time-sensitive data stream; or the packet filter information of the first QoS stream is set to the data frame specification of the time-sensitive data stream.

For example, when the first QoS stream is mapped to a first time-sensitive data stream, the packet filter information of the first QoS stream can be set to the data frame specification of the first time-sensitive data stream, so that data of the first time-sensitive data stream is mapped to the first QoS stream. Then, when the first QoS stream needs to be mapped to a second time-sensitive data stream, the data frame specification of the first time-sensitive data stream and the data frame specification of the second time-sensitive data stream can be included in the packet filter information of the first QoS stream, so that data of the first time-sensitive data stream and the second time-sensitive data stream is mapped to the first QoS stream.

(2.7) In an embodiment of the present disclosure, optionally, the determining, according to the first information, whether indication information indicates time-sensitive includes: the indication information indicating whether the first QoS stream is time-sensitive is set to time-sensitive.

In an embodiment of the present disclosure, first QoS-related information, first container information, and/or transfer configuration information of a time-sensitive data stream are sent to the first target end. Further, the first container information may include the transfer configuration information of the time-sensitive data stream or an SRP message; and the SRP message includes the transfer configuration information of the time-sensitive data stream.

Optionally, the first target end may include at least one of the following: a RAN network element, a terminal, or a CN network element (for example, an SMF, an AMF, and a UPF).

Specifically, the first container can be transparent to a communication network element that transmits the first container (such as an AMF, an SMF, and/or a RAN network element), and visible to a terminal and/or an anchor gateway (such as an anchor UPF). It is not difficult to understood that the terminal or the anchor gateway as the gateway exit needs to understand the transfer configuration information of the time-sensitive data stream, and the communication network element that transmits the transfer configuration information of the time-sensitive data stream does not need to understand the transfer configuration information of the time-sensitive data stream.

In an implementation, when establishing or modifying the first QoS stream, sending the first QoS-related information, the first container information, and/or the transfer configuration information of the time-sensitive data stream to the first target end.

For example, the first QoS-related information, the first container information, and/or the transfer configuration information of the time-sensitive data stream are included in related signaling for establishing or modifying the first QoS stream (such as related signaling for PDU session modification), the first QoS-related information, the first container information, and/or the transfer configuration information of the time-sensitive data stream are sent to the first target end.

In the embodiments of the present disclosure, the QoS stream to which the sensitive data stream is mapped, the first QoS-related information of the QoS stream, and/or the transfer configuration information of the sensitive data stream can be determined according to the transfer configuration information of the sensitive data stream and a capability of a bridge formed by a network and a terminal. The first QoS-related information and/or the transfer configuration information of the sensitive data stream are determined by transferring, a reserved resource of each communication device for QoS guarantee is determined, and it is determined that the communication device at the exit of the bridge can meet the transfer configuration requirement of the sensitive data stream, thereby meeting relevant requirements of quality of service of time-sensitive communication.

Figure 5:
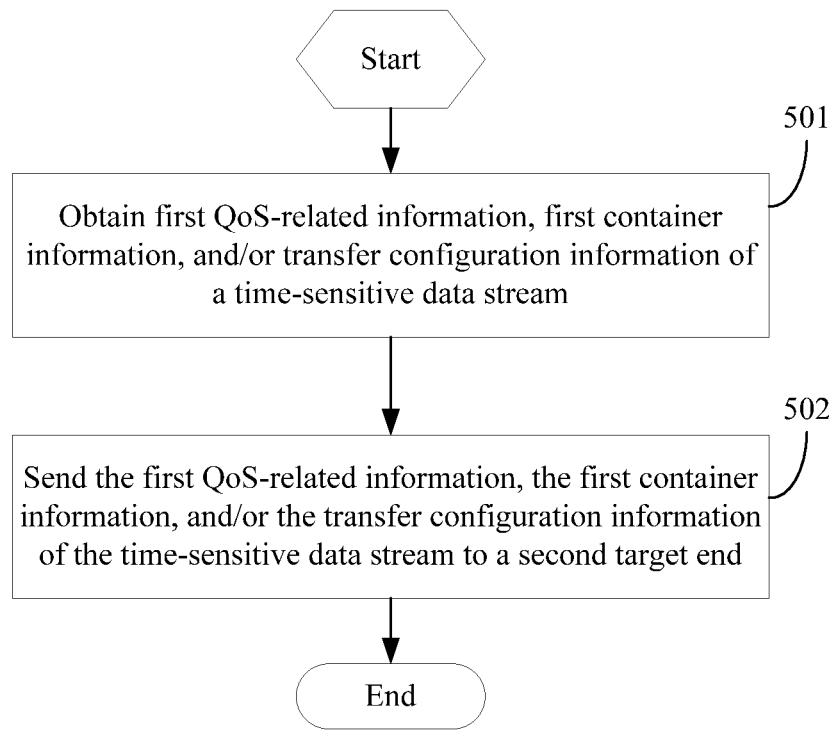
FIG. 5 is a schematic flowchart of a method for supporting quality of service of time-sensitive communication according to another embodiment of the present disclosure.

Referring to FIG. 5, the embodiments of the present disclosure further provide a method for supporting quality of service of time-sensitive communication, applied to a second communication device. The second communication device may include, but is not limited to, one of the following: an SMF and an AMF. The method may include step 501 and step 502.

Step 501: Obtain first QoS-related information, first container information, and/or transfer configuration information of a time-sensitive data stream.

Step 502: Send the first QoS-related information, the first container information, and/or the transfer configuration information of the time-sensitive data stream to a second target end.

Optionally, the first container information may include the transfer configuration information of the time-sensitive data stream or an SRP message; and the SRP message includes the transfer configuration information of the time-sensitive data stream.

Specifically, the first container can be transparent to a communication network element that transmits the first container (such as an AMF, an SMF, and/or a RAN network element), and visible to a terminal and/or an anchor gateway (such as an anchor UPF). It is not difficult to understood that the terminal or the anchor gateway as the gateway exit needs to understand the transfer configuration information of the time-sensitive data stream, and the communication network element that transmits the transfer configuration information of the time-sensitive data stream does not need to understand the transfer configuration information of the time-sensitive data stream.

Further, the second target end may include at least one of the following: a RAN network element, a terminal, or a CN network element (for example, an AMF and a UPF).

In an implementation, when the first QoS-related information is authorized first QoS-related information, the second communication device is an SMF, and the second target end may be an AMF; or the second communication device is an AMF, and the second target end can be a RAN network element and/or a terminal.

When the first QoS-related information is requested first QoS-related information, the second communication device is an SMF and the second target end can be a PCF; or the second communication device is an AMF and the second target end can be an SMF.

In an implementation, when establishing or modifying the first QoS stream, obtaining the first QoS-related information, the first container information, and/or the transfer configuration information of the time-sensitive data stream, where the first QoS stream is a QoS stream to which the time-sensitive data stream is mapped.

In an implementation, when establishing or modifying the first QoS stream, sending the first QoS-related information, the first container information, and/or the transfer configuration information of the time-sensitive data stream to the second target end, where the first QoS stream is a QoS stream to which the time-sensitive data stream is mapped.

For example, the first QoS-related information, the first container information, and/or the transfer configuration information of the time-sensitive data stream are included in related signaling for establishing or modifying the first QoS stream (such as related signaling for PDU session modification), the first QoS-related information, the first container information, and/or the transfer configuration information of the time-sensitive data stream are sent to the second target end.

In the embodiments of the present disclosure, the QoS stream to which the sensitive data stream is mapped, the first QoS-related information of the QoS stream, and/or the transfer configuration information of the sensitive data stream can be determined according to the transfer configuration information of the sensitive data stream and a capability of a bridge formed by a network and a terminal. The first QoS-related information and/or the transfer configuration information of the sensitive data stream are determined by transferring, a reserved resource of each communication device for QoS guarantee is determined, and it is determined that the communication device at the exit of the bridge can meet the transfer configuration requirement of the sensitive data stream, thereby meeting relevant requirements of quality of service of time-sensitive communication.

Figure 6:
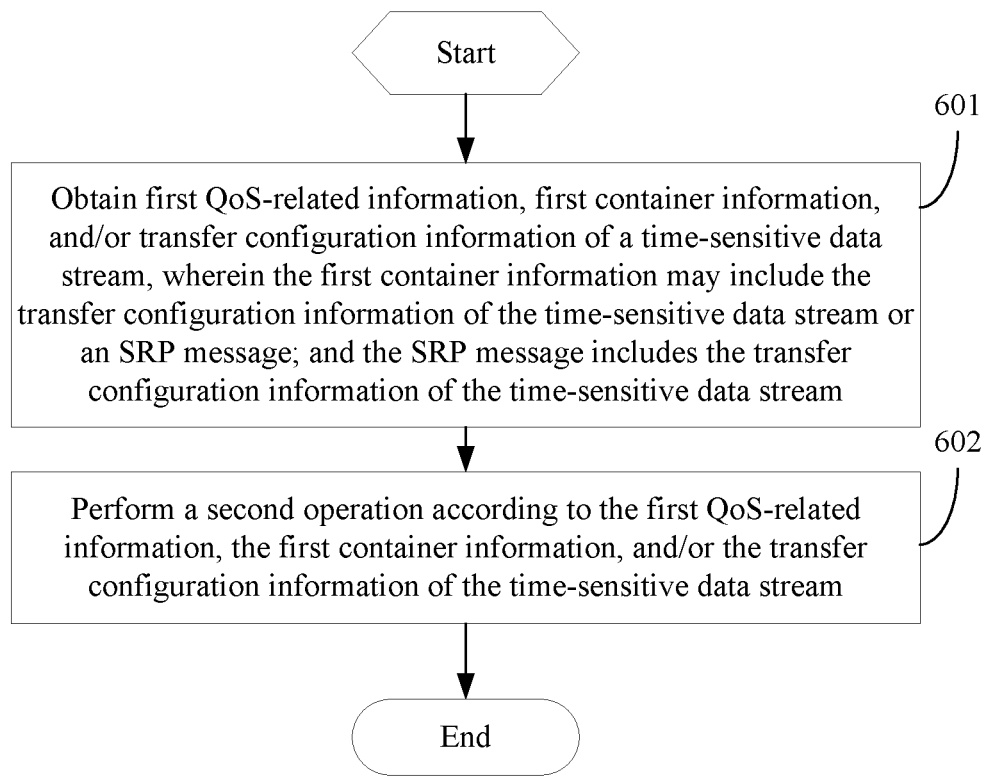
FIG. 6 is a schematic flowchart of a method for supporting quality of service of time-sensitive communication according to still another embodiment of the present disclosure.

Referring to FIG. 6, the present disclosure further provides a method for supporting quality of service of time-sensitive communication, applied to a third communications device. The third communication device may include, but is not limited to, one of the following: a RAN network element, a terminal, and a UPF. The method may include step 601 and step 602.

Step 601: Obtain first QoS-related information, first container information, and/or transfer configuration information of a time-sensitive data stream, where the first container information may include the transfer configuration information of the time-sensitive data stream or an SRP message; and the SRP message includes the transfer configuration information of the time-sensitive data stream.

Step 602: Perform a second operation according to the first QoS-related information, the first container information, and/or the transfer configuration information of the time-sensitive data stream.

Specifically, the first container can be transparent to a communication network element that transmits the first container (such as an AMF, an SMF, and/or a RAN network element), and visible to a terminal and/or an anchor gateway (such as an anchor UPF). It is not difficult to understood that the terminal or the anchor gateway as the gateway exit needs to understand the transfer configuration information of the time-sensitive data stream, and the communication network element that transmits the transfer configuration information of the time-sensitive data stream does not need to understand the transfer configuration information of the time-sensitive data stream.

In an implementation, when establishing or modifying the first QoS stream, obtaining the first QoS-related information, the first container information, and/or the transfer configuration information of the time-sensitive data stream, where the first QoS stream is a QoS stream to which the time-sensitive data stream is mapped.

Specifically, related signaling for establishing or modifying the first QoS stream (such as related signaling for PDU session modification) is received, and the information includes the first QoS-related information, the first container information, and/or the transfer configuration information of the time-sensitive data stream, so that the first QoS-related information, the first container information, and/or the transfer configuration information of the time-sensitive data stream are received.

In an embodiment of the present disclosure, optionally, the second operation may include at least one of the following:

mapping the first QoS stream to an independent DRB;
performing QoS guarantee for the first QoS stream;
determining that successfully or unsuccessfully establishing the first QoS stream is returned; or
determining that successfully or unsuccessfully modifying the first QoS stream is returned.

The first QoS stream is a QoS stream to which the time-sensitive data stream is mapped.

In an implementation, performing QoS guarantee for the first QoS stream includes an operation for performing resource reservation for the first QoS stream, which may include at least one of the following: determining scheduled delay budget, determining a size of a reserved resource block, or determining the number of reserved resource blocks.

In an implementation, the delay budget of resource reservation is set to the latest data sending start time in the data sending interval-air interface transmission delay.

It is understandable that the RAN and the terminal provide different QoS guarantee for the first QoS stream.

In an implementation, the RAN performs QoS guarantee for the first QoS stream according to the first QoS-related information.

In another implementation, the terminal provides QoS guarantee for the first QoS stream according to the transfer configuration information of the time-sensitive data stream and/or the first QoS-related information.

In an implementation, the terminal receives the transfer configuration information of the time-sensitive data stream when the QoS stream is established. When the requirement of the transfer configuration information of the time-sensitive data stream cannot be met, the terminal returns a QoS stream establishment failure.

In an implementation, the terminal receives the transfer configuration information of the time-sensitive data stream when the QoS stream is modified. When the requirement of the transfer configuration information of the time-sensitive data stream cannot be met, the terminal returns a QoS stream modification failure.

In the embodiments of the present disclosure, the QoS stream to which the sensitive data stream is mapped, the first QoS-related information of the QoS stream, and/or the transfer configuration information of the sensitive data stream can be determined according to the transfer configuration information of the sensitive data stream and a capability of a bridge formed by a network and a terminal. The first QoS-related information and/or the transfer configuration information of the sensitive data stream are determined by transferring, a reserved resource of each communication device for QoS guarantee is determined, and it is determined that the communication device at the exit of the bridge can meet the transfer configuration requirement of the sensitive data stream, thereby meeting relevant requirements of quality of service of time-sensitive communication.

Figure 7:
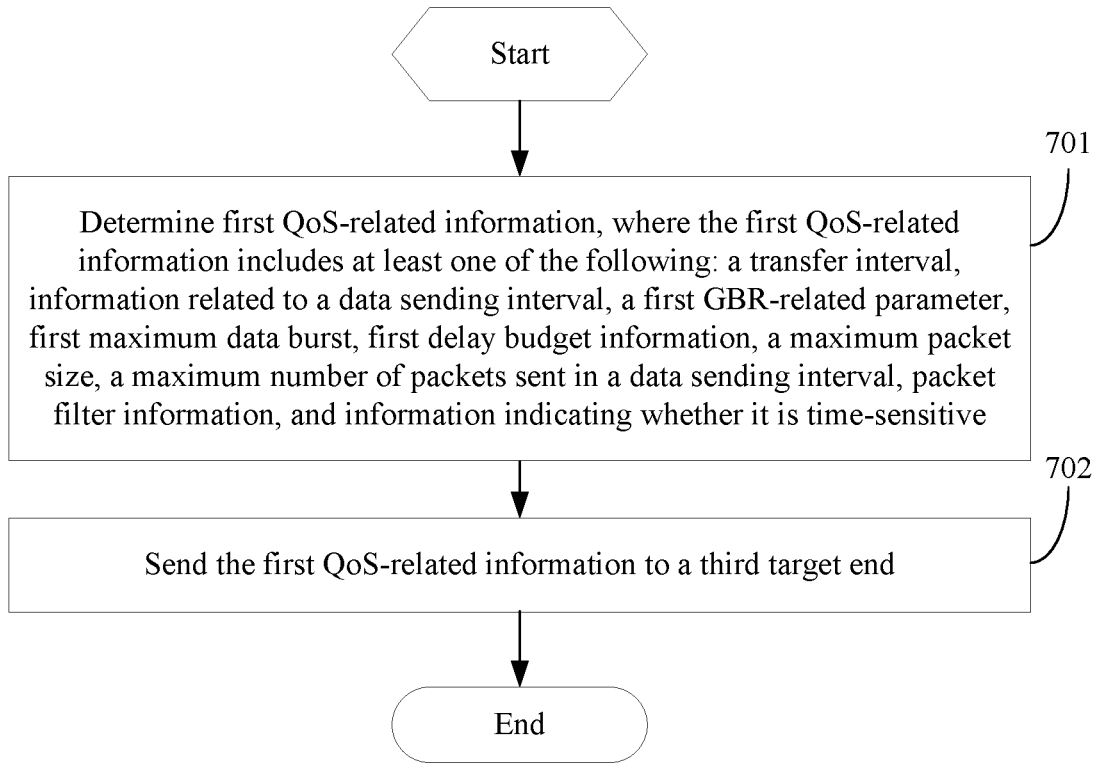
FIG. 7 is a schematic flowchart of a method for supporting quality of service of time-sensitive communication according to yet another embodiment of the present disclosure.

Referring to FIG. 7, the embodiments of the present disclosure provide a method for supporting quality of service of time-sensitive communication, applied to a fourth communication device. The fourth communication device may include, but is not limited to, one of the following: a PCF, an SMF, an AMF, and a terminal. The method may include step 701 to step 702.

Step 701: Determine first QoS-related information, where the first QoS-related information may include at least one of the following: a transfer interval, information related to a data sending interval, a first GBR-related parameter, first maximum data burst, first delay budget information, a maximum packet size, a maximum number of packets sent in a data sending interval, packet filter information, or information indicating whether it is time-sensitive.

Step 702: Send the first QoS-related information to a third target end.

In an embodiment of the present disclosure, the first maximum data burst is the maximum data burst within the transfer interval.

In an embodiment of the present disclosure, optionally, the information related to the data sending interval includes at least one of the following: an earliest data sending start time within the transfer interval, a latest data sending start time within the transfer interval, or a data sending end time within the transfer interval.

Further, the data sending interval may be one of the following: duration between an earliest data sending start time within the transfer interval and a data sending end time within the transfer interval, and duration between a latest data sending start time within the transfer interval and a data sending end time within the transfer interval.

For example, the data sending end time in the transfer interval can be the end time of the transfer interval. The earliest data sending start time in the transfer interval can be reflected by the earliest time offset from the start time of the transfer interval. The latest data sending start time in the transfer interval can be reflected by the latest time offset from the start time of the transfer interval. The data sending start time can be the data sending start offset+the start time of the transfer interval. Optionally, the data sending start offset is zero.

In an embodiment of the present disclosure, optionally, when the first QoS-related information includes information related to the data sending interval, the first GBR parameter is a GBR-related parameter of the data sending interval.

In an embodiment of the present disclosure, optionally, the GBR-related parameter of the data sending interval refers to a GBR-related parameter requirement within the data sending interval. It is not difficult to understand that outside the data sending interval, no data is sent, and no resource needs to be reserved.

Further, the GBR-related parameter can include at least one of the following: an uplink GFBR, an uplink MFBR, a downlink GFBR, or a downlink MFBR.

In an embodiment of the present disclosure, optionally, the first delay budget information can include at least one of the following: a delay budget information element in microseconds, a delay budget information element in a symbol, or a delay budget information element in 0.5 milliseconds.

In an embodiment of the present disclosure, optionally, the first delay budget information may be delay budget information for the terminal and the RAN network element. Further, the delay budget information may include at least one of the following: maximum delay budget or minimum delay budget.

In an embodiment of the present disclosure, optionally, the delay budget information for the terminal and the RAN network element can include at least one of the following: end-to-end delay budget information for the terminal and the RAN network element, or transmission delay budget information of each data packet between the terminal and the RAN.

Further, the delay budget information for the terminal and the RAN network element can be delay information in microseconds or one symbol.

In an embodiment of the present disclosure, the maximum packet size and the maximum number of packets sent in the data sending interval can guide resource reservation in the data interval.

Further, the first QoS-related information can be the first QoS-related information requested by the terminal. The first QoS-related information can be carried in the requested QoS stream description and/or the requested QoS rule.

Further, the first QoS-related information can be the first QoS-related information authorized to the terminal. The first QoS-related information can be carried in the authorized QoS stream description and/or the requested QoS rule.

In an embodiment of the present disclosure, optionally, when the fourth communication device is a terminal, the third target end may be an AMF; or when the fourth communication device is an AMF, the third target end may be an SMF or a PCF; or when the fourth communication device is an SMF, the third target end is a PCF.

In the embodiments of the present disclosure, the QoS stream to which the sensitive data stream is mapped, the first QoS-related information of the QoS stream, and/or the transfer configuration information of the sensitive data stream can be determined according to the transfer configuration information of the sensitive data stream and a capability of a bridge formed by a network and a terminal. The first QoS-related information and/or the transfer configuration information of the sensitive data stream are determined by transferring, a reserved resource of each communication device for QoS guarantee is determined, and it is determined that the communication device at the exit of the bridge can meet the transfer configuration requirement of the sensitive data stream, thereby meeting relevant requirements of quality of service of time-sensitive communication.

The following describes the method for supporting quality of service of time-sensitive communication in the embodiments of the present disclosure with reference to a specific application scenario.

Figure 8:
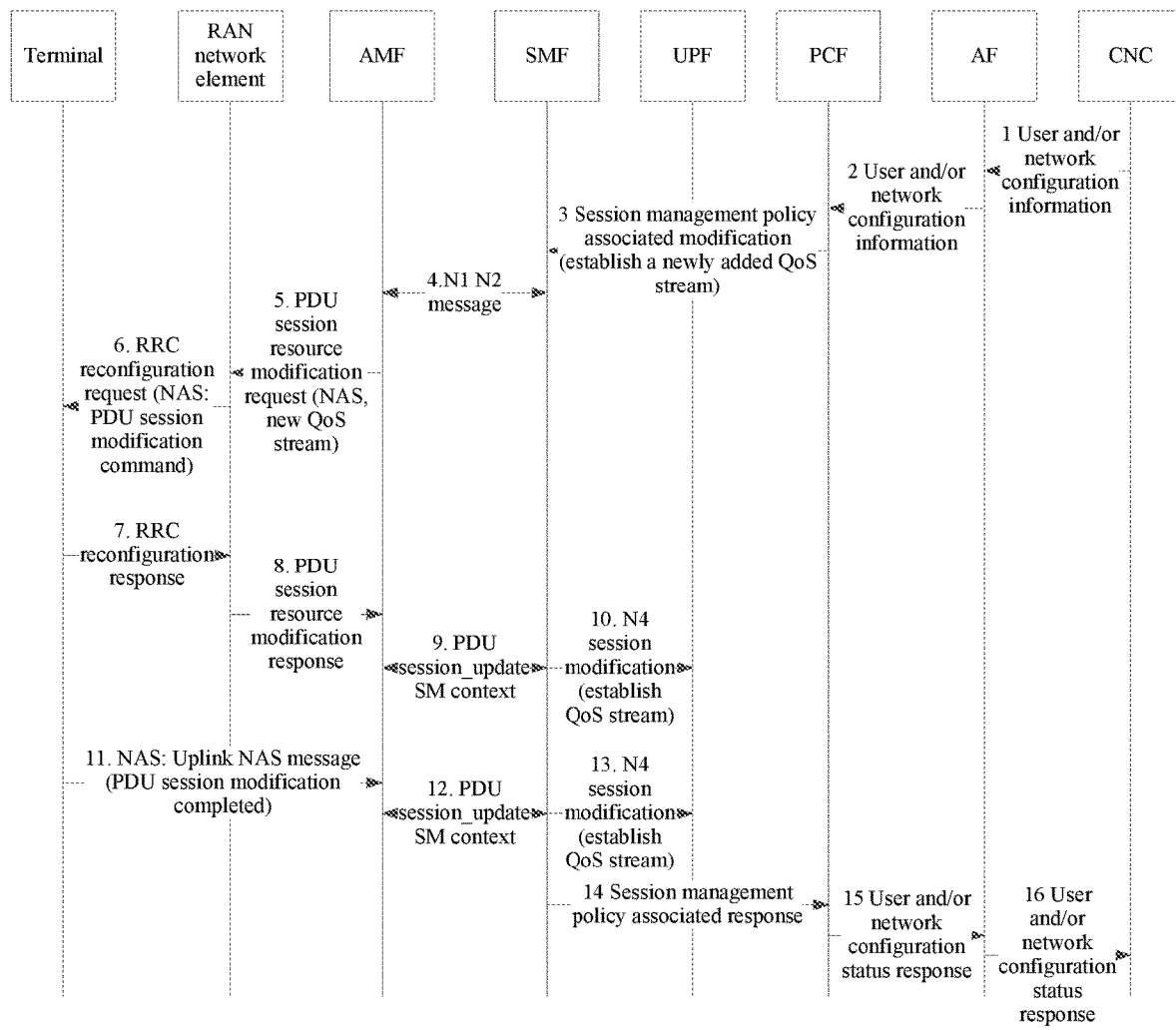
FIG. 8 is a schematic flowchart of a method for supporting quality of service of time-sensitive communication in application scenario 1 according to an embodiment of the present disclosure.

Application scenario 1 according to an embodiment of the present disclosure:

In the application scenario 1 of the embodiments of the present disclosure, the process of requesting establishment of a time-sensitive related QoS stream by a PCF is mainly described. Referring to FIG. 8, the process includes the following steps:

Step 1 and Step 2: A CNC sends user and/or network configuration information to a PCF through an AF.

According to a listener group in the user and/or network configuration information, the PCF can obtain, through indexing, a terminal and an SMF serving the terminal. The PCF configures the first QoS-related information according to the user and/or network configuration information and capability information of a bridge formed by a terminal and a 3GPP network.

Step 3: The PCF sends the first QoS-related information to the SMF, to request establishment or modification of a corresponding QoS stream. The PCF sends the first QoS-related information by sending a session management policy management modification request.

Step 4: The SMF sends an N1N2 message to an AMF.

Step 5: The AMF sends a protocol data unit (PDU) session resource modification request to a RAN network element, and sends the authorized first QoS-related information to the RAN network element, to request establishment of a QoS stream. The PDU session modification request includes QoS context and QoS stream identifier of the QoS stream, and a NAS message (PDU session modification command).

Step 6: The RAN network element sends an RRC reconfiguration request to the terminal. The RRC reconfiguration request includes a configuration of a DRB to which the QoS stream is mapped and the NAS message (PDU session modification command).

Step 7: The terminal returns an RRC reconfiguration response to the RAN network element.

Step 8: The RAN network element returns a PDU session resource modification response to the AMF.

Step 9: The AMF triggers the SMF to perform the PDU session_SM context modification process.

Step 10: Optionally, the SMF sends a PDU session modification request over an N4 interface to a UPF to add a new QoS stream for a first PDU session. The PDU session modification request of the N4 interface includes a QoS rule of the newly added QoS stream.

Step 11: The terminal sends an uplink NAS message to a first network AMF. The NAS message includes that PDU session modification is completed.

Step 12: The AMF triggers the SMF to perform the PDU session_SM context modification process.

Step 13: Optionally, the SMF sends a PDU session modification over N4 interface to a UPF.

Step 14: The SMF sends a session management policy management modification response to the PCF.

Step 15 and Step 16: The PCF returns a user and/or network configuration status response to the CNC through the AF.

In the embodiments of the present disclosure, resource reservation and scheduling for transmission of time-sensitive data can be supported, and the implementation of applying time-sensitive network in the 3GPP network can be supported.

Figure 9:
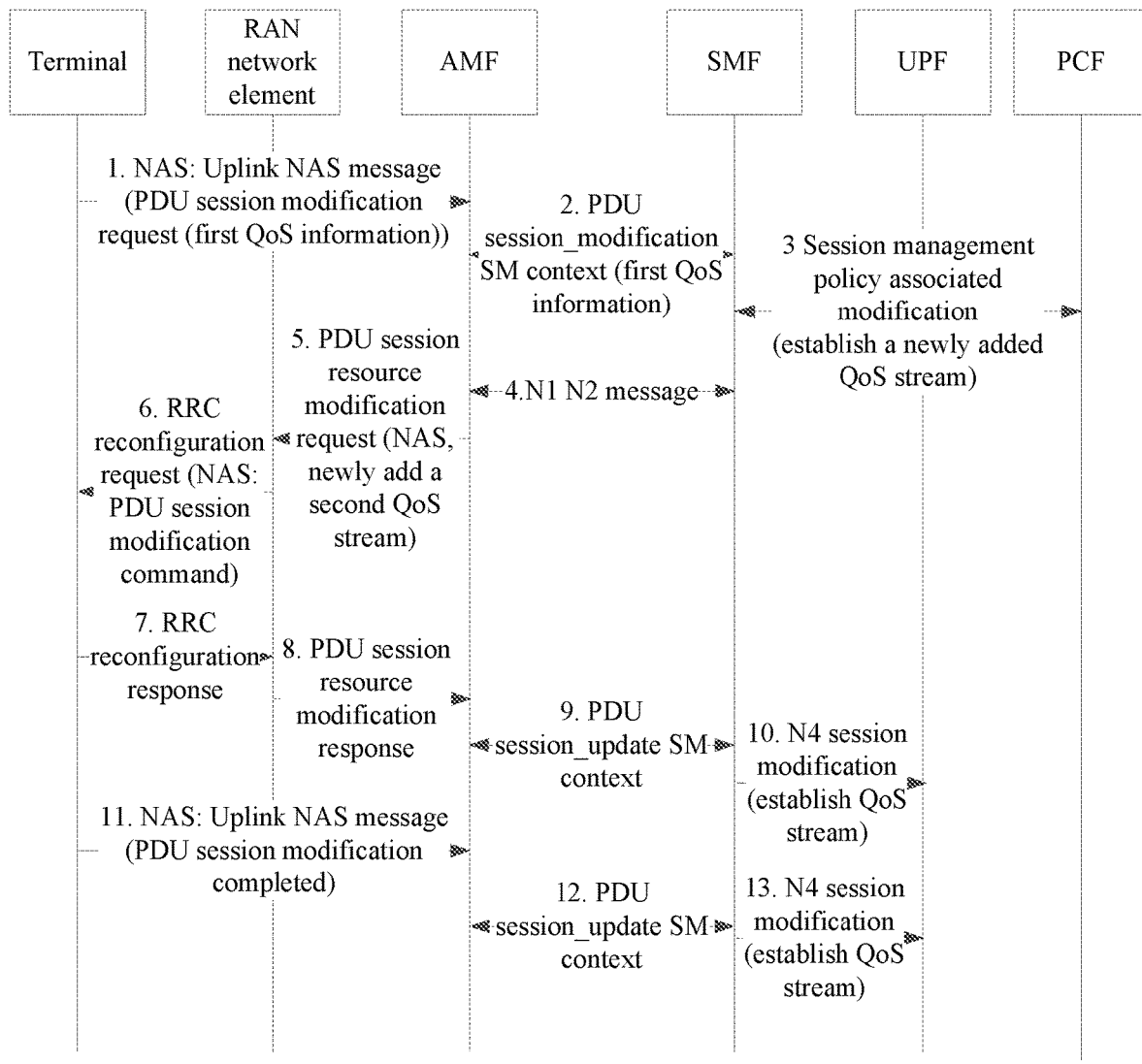
FIG. 9 is a schematic flowchart of a method for supporting quality of service of time-sensitive communication in application scenario 2 according to an embodiment of the present disclosure.

Application scenario 2 according to an embodiment of the present disclosure:

In the application scenario 2 of the embodiments of the present disclosure, the process of requesting to establish a QoS stream by the terminal is mainly described. Referring to FIG. 9, the process includes the following steps:

Step 1: A terminal sends an uplink NAS message to an AMF to add a new QoS stream for a first PDU session.

A PDU session modification request can be included in the NAS message, and the following information can be included in the PDU session modification request: requested first QoS-related information.

Step 2: The AMF sends a PDU session_SM (session management) context modification request message to the SMF.

The PDU session_SM context modification request can include the following information: a PDU session identifier of the first PDU session, a requested QoS rule, and/or a requested QoS stream description.

Optionally, the first QoS-related information can be included in the requested QoS rule.

Optionally, the first QoS-related information can be included in the requested QoS stream description.

When establishment of the QoS stream is determined, the first network SMF returns a PDU session_SM context modification response to the first network AMF.

Step 3: The SMF initiates session management policy associated modification.

It is understandable that step 3 is optional.

Step 4: The SMF sends an N1N2 message to an AMF.

Step 5: The AMF sends a PDU session resource modification request to a RAN network element, and sends the authorized first QoS-related information to the RAN network element, to request establishment of a QoS stream.

The PDU session modification request may include QoS context and QoS stream identifier of the QoS stream, and a NAS message (PDU session modification command).

Step 6: The RAN network element sends an RRC reconfiguration request to the terminal. The RRC reconfiguration request includes a configuration of a DRB to which the QoS stream is mapped and the NAS message (PDU session modification command).

Step 7: The terminal returns a radio resource control (RRC) reconfiguration response to the RAN network element.

Step 8: The RAN network element returns a PDU session resource modification response to the AMF.

Step 9: The AMF triggers the SMF to perform the PDU session_SM context modification process.

Step 10: The SMF sends a PDU session modification request over an N4 interface to a UPF to add a new QoS stream for a first PDU session. The PDU session modification request of the N4 interface includes a QoS rule of the newly added QoS stream.

It is understandable that step 10 is optional.

Step 11: The terminal sends an uplink NAS message to a first network AMF.

The NAS message includes that PDU session modification is completed.

Step 12: The AMF triggers the SMF to perform the PDU session_SM context modification process.

Step 13: The SMF sends a PDU session modification over an N4 interface to a UPF.

It is understandable that step 13 is optional.

In the embodiments of the present disclosure, resource reservation and scheduling for transmission of time-sensitive data can be supported, and the implementation of applying time-sensitive network in the 3GPP network can be supported.

An embodiment of the present disclosure further provides a first communication device. Because a problem resolving principle of the first communication device is similar to that of the method for supporting quality of service of time-sensitive communication in the embodiments of the present disclosure, for implementation of the first communication device, reference may be made to implementation of the method, and repeated parts are not described.

Figure 10:
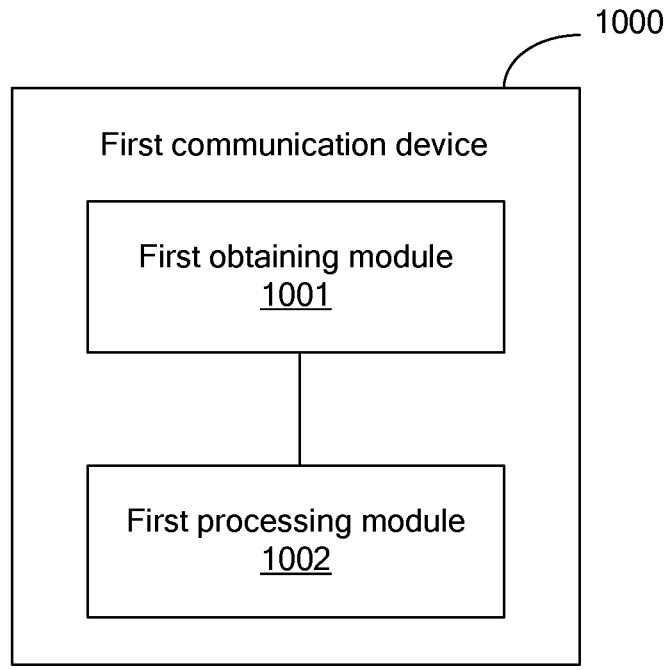
FIG. 10 is a schematic diagram of a first communication device according to an embodiment of the present disclosure.

As shown in FIG. 10, an embodiment of the present disclosure further provides a first communication device. The first communication device 1100 includes:

a first obtaining module 1001, configured to obtain first information, where the first information includes at least one of the following: transfer configuration information of a time-sensitive data stream, or bridge capability information; and a first processing module 1002, configured to perform a first operation according to the first information.

Optionally, the transfer configuration information of the time-sensitive data stream includes user and/or network configuration information.

Optionally, the transfer configuration information of the time-sensitive data stream includes at least one of the following: a transfer interval, a maximum frame size, a maximum number of frames sent within the transfer interval, an earliest data sending start time offset within the transfer interval, a latest data sending start time offset within the transfer interval, or jitter time.

Optionally, the transfer configuration information of the time-sensitive data stream is: the transfer configuration information of the time-sensitive data stream that is received; or the transfer configuration information of the time-sensitive data stream that is generated based on the transfer configuration information of the time-sensitive data stream in the received SRP message.

Optionally, the bridge capability information is capability information of a bridge formed by a terminal and a wireless communication network, and the bridge capability information includes: a bridge delay.

Optionally, the first operation includes at least one of the following:

determining a quality of service QoS stream to which the time-sensitive data stream is mapped;

determining first QoS-related information of a first QoS stream, where the first QoS stream is a QoS stream to which the time-sensitive data stream is mapped;

determining an indicator indicating whether to map an independent bearer resource; or determining configuration information of the time-sensitive data stream.

Optionally, the determining, according to the first information, a QoS stream to which the time-sensitive data stream is mapped includes at least one of the following:

when a first condition is satisfied, mapping multiple time-sensitive data streams to a same QoS stream;

when a second condition is satisfied, mapping different time-sensitive data streams to different QoS streams; or mapping each time-sensitive data stream to an independent QoS stream.

Optionally, the first condition includes at least one of the following: multiple time-sensitive data streams have a same transfer interval;

multiple time-sensitive data streams have the same data sending start time;

multiple time-sensitive data streams have a same service traffic specification; or receive-end listeners of the multiple time-sensitive data streams are connected to a same terminal.

The second condition includes at least one of the following:

multiple time-sensitive data streams have different transfer intervals;

multiple time-sensitive data streams have different data sending start time;

multiple time-sensitive data streams have different service traffic specifications; or listeners of the multiple time-sensitive data streams are connected to different terminals.

Optionally, the first QoS-related information includes at least one of the following: a transfer interval, information related to a data sending interval, a first GBR-related parameter, first maximum data burst, first delay budget information, a maximum packet size, a maximum number of packets sent in a data sending interval, packet filter information, or information indicating whether it is time-sensitive.

Optionally, the determining information related to a data sending interval according to the first information includes:

determining the information related to the data sending interval according to at least one of the transfer interval, the earliest data sending start time offset within the transfer interval, the latest data sending start time offset within the transfer interval, or the jitter time in the transfer configuration information of the time-sensitive data stream and/or the bridge capability information.

Optionally, the determining the first GBR-related parameter according to the first information includes:

determining the first GBR-related parameter according to at least one of the transfer interval, the maximum frame size, the maximum number of frames sent within the transfer interval, the earliest data sending start time offset within the transfer interval, the latest data sending start time offset within the transfer interval, or the jitter time in the transfer configuration information of the time-sensitive data stream and the information related to the data sending interval.

Optionally, the information related to the data sending interval includes at least one of the following: an earliest data sending start time within the transfer interval, a latest data sending start time within the transfer interval, a data sending start time within the transfer interval, a data sending end time within the transfer interval, an earliest data sending start time offset within the transfer interval, or a latest data sending start time offset within the transfer interval.

Optionally, the determining a first maximum data burst according to the first information includes:

determining the maximum data burst according to the maximum frame size and/or the maximum number of frames sent within the transfer interval in the transfer configuration information of the time-sensitive data stream.

Optionally, the determining the first delay budget information according to the first information includes:

determining delay budget information between the terminal and a RAN network element according to at least one of a confirmed latest data sending time within the transfer interval, a delay between the RAN network element and an anchor UPF, or a processing delay of the terminal.

Optionally, the maximum packet size is the maximum frame size of the time-sensitive data stream.

Optionally, the determining the packet filter information according to the first information includes:

the packet filter information of the first QoS stream includes the data frame specification (Data Frame Specification, such as the data frame specification in the IEEE 802.1Q series) of the time-sensitive data stream; or the packet filter information of the first QoS stream is set to the data frame specification of the time-sensitive data stream.

Optionally, the determining, according to the first information, indication information indicating whether it is time-sensitive includes:

a value of the indication information indicating whether the first QoS stream is time-sensitive is set to time-sensitive.

Optionally, the first communication device further includes: a sending module, configured to send the first QoS-related information, the first container information, and/or the transfer configuration information of the time-sensitive data stream to a first target end, where the first container information includes the transfer configuration information of the time-sensitive data stream or a stream reservation protocol SRP message; and the SRP message includes the transfer configuration information of the time-sensitive data stream.

Optionally, the sending module is further configured to: when establishing or modifying the first QoS stream, send the first QoS-related information, the first container information, and/or the transfer configuration information of the time-sensitive data stream to the first target end.

Optionally, the first target end includes at least one of the following: a RAN network element, a terminal, or a CN network element.

The first communication device provided in embodiments of the present disclosure may perform the foregoing method embodiment. An implementation principle and a technical effect thereof are similar, and details are not described again in this embodiment.

An embodiment of the present disclosure further provides a second communication device. Because a problem resolving principle of the second communication device is similar to that of the method for supporting quality of service of time-sensitive communication in the embodiments of the present disclosure, for implementation of the second communication device, reference may be made to implementation of the method, and repeated parts are not described.

Figure 11:
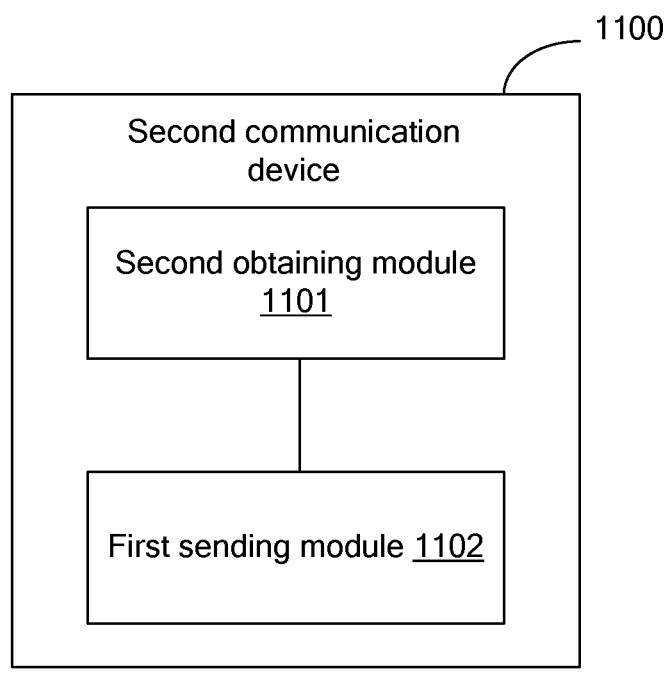
FIG. 11 is a schematic diagram of a second communication device according to an embodiment of the present disclosure.

As shown in FIG. 11, an embodiment of the present disclosure further provides a second communication device. The second communication device 1100 includes:

a second obtaining module 1101, configured to obtain first QoS-related information and/or transfer configuration information of a time-sensitive data stream; and a first sending module 1102, configured to send the first QoS-related information and/or the transfer configuration information of the time-sensitive data stream to a second target end.

Optionally, the second obtaining module 1101 is further configured to: when establishing or modifying the first QoS stream, obtain the first QoS-related information, the first container information, and/or the transfer configuration information of the time-sensitive data stream, where the first QoS stream is a QoS stream to which the time-sensitive data stream is mapped.

Optionally, the first sending module 1102 is further configured to: when establishing or modifying the first QoS stream, send the first QoS-related information, the first container information, and/or the transfer configuration information of the time-sensitive data stream to the second target end, where the first QoS stream is a QoS stream to which the time-sensitive data stream is mapped.

Optionally, the second target end includes at least one of the following: a RAN network element, a terminal, or a CN network element.

The second communication device provided in embodiments of the present disclosure may perform the foregoing method embodiment. An implementation principle and a technical effect thereof are similar, and details are not described again in this embodiment.

An embodiment of the present disclosure further provides a third communication device. Because a problem resolving principle of the third communication device is similar to that of the method for supporting quality of service of time-sensitive communication in the embodiments of the present disclosure, for implementation of the third communication device, reference may be made to implementation of the method, and repeated parts are not described.

Figure 12:
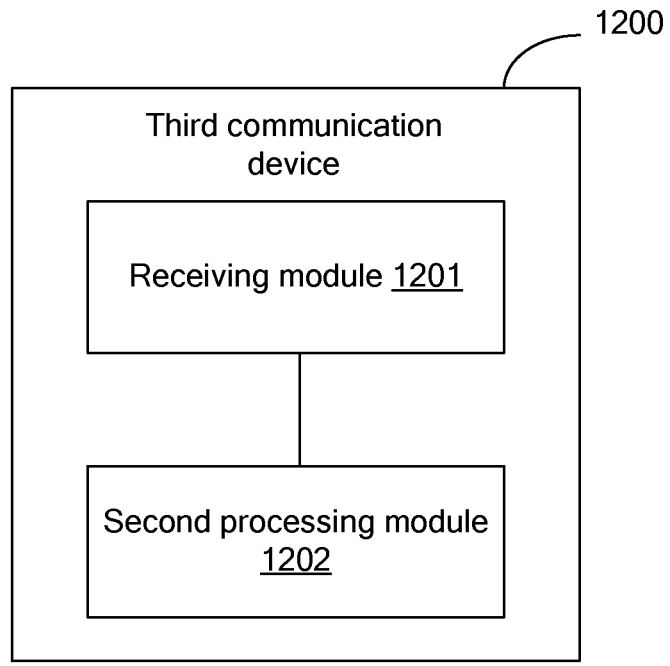
FIG. 12 is a schematic diagram of a third communication device according to an embodiment of the present disclosure.

As shown in FIG. 12, an embodiment of the present disclosure further provides a third communication device. The third communication device 1200 includes:

a receiving module 1201, configured to obtain first QoS-related information, first container information, and/or transfer configuration information of a time-sensitive data stream, where the first container information includes the transfer configuration information of the time-sensitive data stream or an SRP message; and the SRP message includes the transfer configuration information of the time-sensitive data stream; and a second processing module 1202, configured to perform a second operation according to the first QoS-related information, the first container information, and/or the transfer configuration information of the time-sensitive data stream.

Optionally, the receiving module 1201 is further configured to: when establishing or modifying the first QoS stream, obtain the first QoS-related information, the first container information, and/or the transfer configuration information of the time-sensitive data stream.

Optionally, the second operation includes at least one of the following:

mapping the first QoS stream to an independent DRB;

performing QoS guarantee for the first QoS stream;

determining that successfully or unsuccessfully establishing the first QoS stream is returned; or determining that successfully or unsuccessfully modifying the first QoS stream is returned.

The first QoS stream is a QoS stream to which the time-sensitive data stream is mapped.

Optionally, performing QoS guarantee for the first QoS stream includes at least one of the following: determining scheduled delay budget, determining a size of a reserved resource block, or determining the number of reserved resource blocks.

The third communication device provided in embodiments of the present disclosure may perform the foregoing method embodiment. An implementation principle and a technical effect thereof are similar, and details are not described again in this embodiment.

An embodiment of the present disclosure further provides a fourth communication device. Because a problem resolving principle of the fourth communication device is similar to that of the method for supporting quality of service of time-sensitive communication in the embodiments of the present disclosure, for implementation of the fourth communication device, reference may be made to implementation of the method, and repeated parts are not described.

Figure 13:
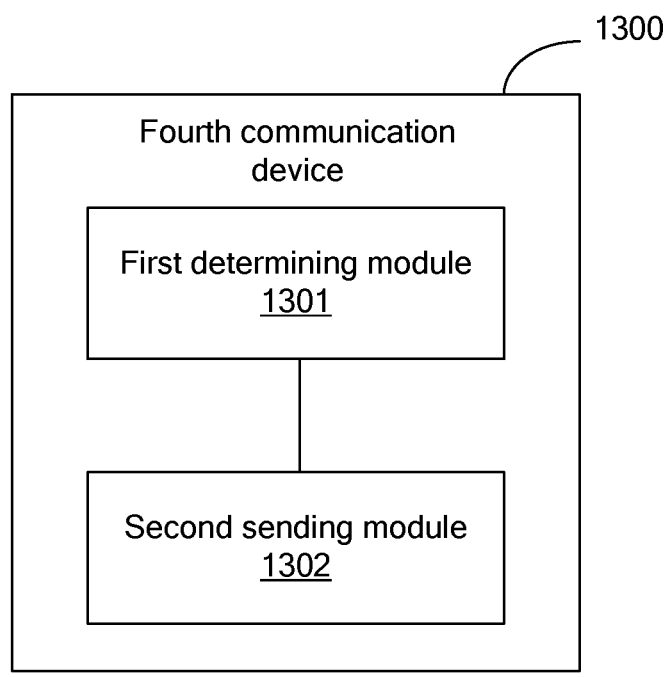
FIG. 13 is a schematic diagram of a fourth communication device according to an embodiment of the present disclosure.

As shown in FIG. 13, an embodiment of the present disclosure further provides a fourth communication device. The fourth communication device 1300 includes:

a first determining module 1301, configured to determine first QoS-related information, where the first QoS-related information includes at least one of the following: a transfer interval, information related to a data sending interval, a first GBR-related parameter, first maximum data burst, first delay budget information, a maximum packet size, a maximum number of packets sent in a data sending interval, packet filter information, or information indicating whether it is time-sensitive; and a second sending module 1302, configured to send the first QoS-related information to a third target end.

Optionally, the information related to the data sending interval includes at least one of the following: an earliest data sending start time within the transfer interval, a latest data sending start time within the transfer interval, or a data sending end time within the transfer interval.

Optionally, when the first QoS-related information includes information related to the data sending interval, the first GBR parameter is a GBR-related parameter of the data sending interval.

Optionally, the data sending interval may be any one of the following: duration between an earliest data sending start time within the transfer interval and a data sending end time within the transfer interval, duration between a latest data sending start time within the transfer interval and a data sending end time within the transfer interval, and a transfer interval.

Optionally, the first delay budget information includes at least one of the following: a delay budget information element in microseconds, a delay budget information element in a symbol, or a delay budget information element in 0.5 milliseconds.

Optionally, the first delay budget information is delay budget information between the terminal and the RAN network element.

The fourth communication device provided in embodiments of the present disclosure may perform the foregoing method embodiment. An implementation principle and a technical effect thereof are similar, and details are not described again in this embodiment.

Figure 14:
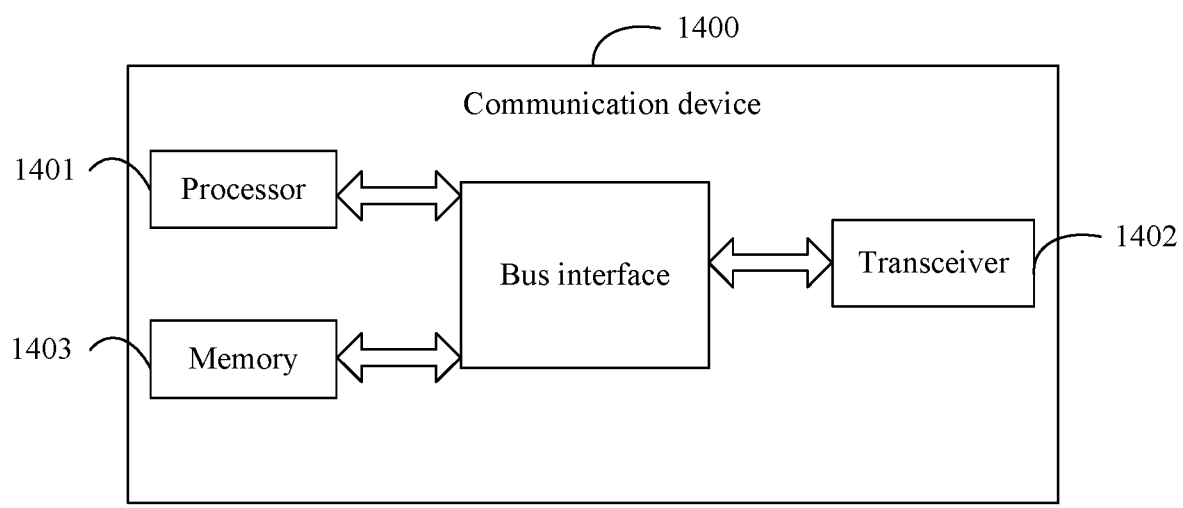
FIG. 14 is a schematic diagram of a communications device according to an embodiment of the present disclosure.

As shown in FIG. 14, an embodiment of the present disclosure further provides a communication device 1400, including: a processor 1401, a transceiver 1402, a memory 1403, and a bus interface.

The processor 1401 may be responsible for managing the bus architecture and general processing. The memory 1403 may store data used by the processor 1401 when the processor 1401 performs an operation.

In the embodiments of the present disclosure, the communication device 1400 may further include: a computer program stored in the memory 1403 and executable on the processor 1401.

In an embodiment of the present disclosure, when the computer program is executed by the processor 1401, the following steps are performed: obtaining first information, where the first information includes at least one of the following: transfer configuration information of a time-sensitive data stream, or bridge capability information; and performing a first operation according to the first information.

In another embodiment of the present disclosure, when the computer program is executed by the processor 1401, the following steps are performed: obtaining first QoS-related information, first container information, and/or transfer configuration information of a time-sensitive data stream, and sending the first QoS-related information, the first container information, and/or the transfer configuration information of the time-sensitive data stream to a second target end; where the first container information includes the transfer configuration information of the time-sensitive data stream or an SRP message; and the SRP message includes the transfer configuration information of the time-sensitive data stream; and In another embodiment of the present disclosure, when the computer program is executed by the processor 1401, the following steps are performed: obtaining first QoS-related information, first container information, and/or transfer configuration information of a time-sensitive data stream, where the first container information includes the transfer configuration information of the time-sensitive data stream or an SRP message; and the SRP message includes the transfer configuration information of the time-sensitive data stream; and performing a second operation according to the first QoS-related information, the first container information, and/or the transfer configuration information of the time-sensitive data stream.

In another embodiment of the present disclosure, when the computer program is executed by the processor 1401, the following steps are performed: determining first QoS-related information, where the first QoS-related information includes at least one of the following: a transfer interval, information related to a data sending interval, a first GBR-related parameter, first maximum data burst, first delay budget information, a maximum packet size, a maximum number of packets sent in a data sending interval, packet filter information, or information indicating whether it is time-sensitive; and sending the first QoS-related information to a third target end.

In FIG. 14, the bus architecture may include any number of interconnected buses and bridges, which are specifically connected together by various circuits of one or more processors represented by the processor 1401 and a memory represented by the memory 1403. The bus architecture may further link various other circuits such as a peripheral device, a voltage regulator, and a power management circuit. These are well known in the art, and therefore are not further described in the embodiments of the present disclosure. A bus interface provides an interface. The transceiver 1402 may include a plurality of elements, that is, include a transmitter and a receiver, and provide units for communication with various other apparatuses on a transmission medium.

The communication device provided in embodiments of the present disclosure may perform the foregoing method embodiment. An implementation principle and a technical effect thereof are similar, and details are not described again in this embodiment.

An embodiment of the present disclosure further provides a computer readable storage medium, storing a computer program, where when the computer program is executed by the processor, the processes of the foregoing embodiments of the method for supporting quality of service of time-sensitive communication are implemented, and the same technical effects can be achieved. To avoid repetition, details are not described herein again. The computer-readable storage medium is, for example, a read-only memory (ROM), a random access memory (RAM), a magnetic disk, or an optical disc.

It should be noted that in this specification, the terms "comprise", "include", and any other variants thereof are intended to cover non-exclusive inclusion, so that a process, a method, an article, or an apparatus that includes a series of elements not only includes these very elements, but also includes other elements not expressly listed, or also includes elements inherent to this process, method, article, or apparatus. Without being subject to further limitations, an element defined by a phrase "including a" does not exclude presence of other identical elements in the process, method, article, or apparatus that includes the very element.

According to the foregoing descriptions of the implementations, a person skilled in the art may clearly understand that the foregoing methods in the embodiments may be implemented by using software and a required universal hardware platform, or certainly may be implemented by using hardware. However, in many cases, the former is a better implementation. Based on such an understanding, the technical solutions of the present disclosure essentially or the part contributing to the prior art may be implemented in a form of a software product. The computer software product is stored in a storage medium (such as a ROM/RAM, a magnetic disk, or an optical disc), and includes several instructions for instructing a terminal (which may be a mobile phone, a computer, a server, an air conditioner, a network device, or the like) to perform the methods described in the embodiments of the present disclosure.

The embodiments of the present disclosure are described above with reference to the accompanying drawings, but the present disclosure is not limited to the foregoing specific implementations. The foregoing specific implementations are merely schematic instead of restrictive. Under enlightenment of the present disclosure, a person of ordinary skills in the art may make many forms without departing from the aims of the present disclosure and the protection scope of claims, all of which fall within the protection of the present disclosure.

The invention claimed is:

1. A method for supporting quality of service of time-sensitive communication, applied to a first communications device, the first communications device being a core network (CN) network element, comprising:
    obtaining first information, wherein the first information comprises at least one of the following: transfer configuration information of a time-sensitive data stream, or bridge capability information; wherein the bridge capability information is capability information of a bridge formed by a terminal and a wireless communication network; wherein the transfer configuration information of the time-sensitive data stream comprises at least one of the following: a transfer interval, a maximum frame size, a maximum number of frames sent within the transfer interval, an earliest data sending start time offset within the transfer interval, a latest data sending start time offset within the transfer interval, or jitter time; and
    performing a first operation according to the first information;
    wherein the first operation comprises at least one of the following:
    determining a quality of service QoS stream to which the time-sensitive data stream is mapped;
    determining first QoS-related information of a first QoS stream, wherein the first QoS stream is a QoS stream to which the time-sensitive data stream is mapped; or
    determining an indicator indicating whether to map an independent bearer resource;
    wherein the determining, according to the first information, a QoS stream to which the time-sensitive data stream is mapped comprises at least one of the following:
    when a first condition is satisfied, mapping multiple time-sensitive data streams to a same QoS stream;
    when a second condition is satisfied, mapping different time-sensitive data streams to different QoS streams; or
    mapping each time-sensitive data stream to an independent QoS stream;
    wherein the method further comprises:
    sending the first QoS-related information, the first container information, and/or the transfer configuration information of the time-sensitive data stream to a first target end;
    wherein the first container information comprises the transfer configuration information of the time-sensitive data stream or a stream reservation protocol SRP message; and the SRP message comprises the transfer configuration information of the time-sensitive data stream; wherein the first target end comprises at least one of the following: a RAN network element, a terminal, or another CN network element rather than the first communications device.

2. The method according to claim 1, wherein the bridge capability information comprises: a bridge delay.

3. The method according to claim 1, wherein
    the first condition comprises at least one of the following:
    multiple time-sensitive data streams have a same transfer interval;
    multiple time-sensitive data streams have the same data sending start time;
    multiple time-sensitive data streams have a same service traffic specification; or
    receive-end listeners of the multiple time-sensitive data streams are connected to a same terminal; and
    the second condition comprises at least one of the following:

multiple time-sensitive data streams have different transfer intervals;
multiple time-sensitive data streams have different data sending start time;
multiple time-sensitive data streams have different service traffic specifications; or
listeners of the multiple time-sensitive data streams are connected to different terminals.

4. The method according to claim 1, wherein
the first QoS-related information comprises at least one of the following: a transfer interval, information related to a data sending interval, a first guaranteed bitrate GBR-related parameter, first maximum data burst, first delay budget information, a maximum packet size, a maximum number of packets sent in a data sending interval, packet filter information, or information indicating whether it is time-sensitive; wherein the first delay budget information is delay budget information for the terminal and the RAN network element.

5. The method according to claim 4, wherein the determining information related to a data sending interval according to the first information comprises:
determining the information related to the data sending interval according to at least one of the transfer interval, the earliest data sending start time offset within the transfer interval, the latest data sending start time offset within the transfer interval, or the jitter time in the transfer configuration information of the time-sensitive data stream and/or the bridge capability information; and/or
wherein the determining the first GBR-related parameter according to the first information comprises:
determining the first GBR-related parameter according to at least one of the transfer interval, the maximum frame size, the maximum number of frames sent within the transfer interval, the earliest data sending start time offset within the transfer interval, the latest data sending start time offset within the transfer interval, or the jitter time in the transfer configuration information of the time-sensitive data stream and the information related to the data sending interval.

6. The method according to claim 5, wherein the information related to the data sending interval comprises at least one of the following: an earliest data sending start time within the transfer interval, a latest data sending start time within the transfer interval, a data sending start time within the transfer interval, a data sending end time within the transfer interval, an earliest data sending start time offset within the transfer interval, or a latest data sending start time offset within the transfer interval.

7. The method according to claim 4, wherein the determining a first maximum data burst according to the first information comprises:
determining the maximum data burst according to the maximum frame size and/or the maximum number of frames sent within the transfer interval in the transfer configuration information of the time-sensitive data stream; and/or
wherein the determining the first delay budget information according to the first information comprises:
determining delay budget information between the terminal and a RAN network element according to at least one of a confirmed latest data sending time within the transfer interval, a delay between the radio access network RAN network element and an anchor UPF, or a processing delay of the terminal.

8. The method according to claim 4, wherein the maximum packet size is the maximum frame size of the time-sensitive data stream; and/or
wherein the determining packet filter information according to the first information comprises:
packet filter information of the first QoS stream comprises the data frame specification of the time-sensitive data stream; or
packet filter information of the first QoS stream is set to the data frame specification of the time-sensitive data stream; and/or
wherein the determining, according to the first information, indication information indicating whether it is time-sensitive comprises:
a value of the indication information indicating whether the first QoS stream is time-sensitive is set to time-sensitive.

9. The method according to claim 1, wherein the sending the first QoS-related information, the first container information, and/or the transfer configuration information of the time-sensitive data stream to a first target end comprises:
when establishing or modifying the first QoS stream, sending the first QoS-related information, the first container information, and/or the transfer configuration information of the time-sensitive data stream to the first target end.

10. A method for supporting quality of service of time-sensitive communication, applied to a third communications device, the third communication device being one of the following: a RAN network element, a terminal, and a UPF, comprising:
obtaining first QoS-related information, first container information, and/or transfer configuration information of a time-sensitive data stream, wherein the first container information comprises the transfer configuration information of the time-sensitive data stream or an SRP message; and the SRP message comprises the transfer configuration information of the time-sensitive data stream; wherein the transfer configuration information of the time-sensitive data stream comprises at least one of the following: a transfer interval, a maximum frame size, a maximum number of frames sent within the transfer interval, an earliest data sending start time offset within the transfer interval, a latest data sending start time offset within the transfer interval, or jitter time; wherein the first QoS-related information is related information of a first QoS stream, and the first QoS stream is a QoS stream to which the time-sensitive data stream is mapped; and
performing a second operation according to the first QoS-related information, the first container information, and/or the transfer configuration information of the time-sensitive data stream;
wherein the second operation comprises at least one of the following:
mapping the first QoS stream to an independent DRB;
performing QoS guarantee for the first QoS stream;
determining that successfully or unsuccessfully establishing the first QoS stream is returned; or
determining that successfully or unsuccessfully modifying the first QoS stream is returned;
wherein the first QoS stream is a QoS stream to which the time-sensitive data stream is mapped.

11. The method according to claim 10, wherein the first QoS-related information comprises at least one of the following: a transfer interval, information related to a data sending interval, a first guaranteed bitrate GBR-related parameter, first maximum data burst, first delay budget information, a maximum packet size, a maximum number of packets sent in a data sending interval, packet filter information, or information indicating whether it is time-sensitive;

wherein the first delay budget information is delay budget information between the terminal and the RAN network element.

12. The method according to claim 10, wherein the obtaining first QoS-related information, first container information, and/or transfer configuration information of a time-sensitive data stream comprises:

when establishing or modifying the first QoS stream, obtaining the first QoS-related information, the first container information, and/or the transfer configuration information of the time-sensitive data stream, wherein the first QoS stream is a QoS stream to which the time-sensitive data stream is mapped.

13. The method according to claim 10, wherein performing QoS guarantee for the first QoS stream comprises at least one of the following: determining scheduled delay budget, determining a size of a reserved resource block, or determining the number of reserved resource blocks.

14. A communications device, the communications device being a core network (CN) network element, comprising: a processor, a memory, and a program that is stored in the memory and that can run on the processor, wherein the program is executed by the processor to implement:

obtaining first information, wherein the first information comprises at least one of the following: transfer configuration information of a time-sensitive data stream, or bridge capability information; wherein the bridge capability information is capability information of a bridge formed by a terminal and a wireless communication network; wherein the transfer configuration information of the time-sensitive data stream comprises at least one of the following: a transfer interval, a maximum frame size, a maximum number of frames sent within the transfer interval, an earliest data sending start time offset within the transfer interval, a latest data sending start time offset within the transfer interval, or jitter time; and performing a first operation according to the first information;

wherein the first operation comprises at least one of the following:

determining a quality of service QoS stream to which the time-sensitive data stream is mapped;

determining first QoS-related information of a first QoS stream, wherein the first QoS stream is a QoS stream to which the time-sensitive data stream is mapped; or determining an indicator indicating whether to map an independent bearer resource;

wherein the determining, according to the first information, a QoS stream to which the time-sensitive data stream is mapped comprises at least one of the following:

when a first condition is satisfied, mapping multiple time-sensitive data streams to a same QoS stream;

when a second condition is satisfied, mapping different time-sensitive data streams to different QoS streams; or mapping each time-sensitive data stream to an independent QoS stream;

wherein the method further comprises:

sending the first QoS-related information, the first container information, and/or the transfer configuration information of the time-sensitive data stream to a first target end;

wherein the first container information comprises the transfer configuration information of the time-sensitive data stream or a stream reservation protocol SRP message; and the SRP message comprises the transfer configuration information of the time-sensitive data stream; wherein the first target end comprises at least one of the following: a RAN network element, a terminal, or another CN network element rather than the first communications device.

15. The communications device according to claim 14, wherein the first condition comprises at least one of the following:

multiple time-sensitive data streams have a same transfer interval;

multiple time-sensitive data streams have the same data sending start time;

multiple time-sensitive data streams have a same service traffic specification; or receive-end listeners of the multiple time-sensitive data streams are connected to a same terminal; and the second condition comprises at least one of the following:

multiple time-sensitive data streams have different transfer intervals;

multiple time-sensitive data streams have different data sending start time;

multiple time-sensitive data streams have different service traffic specifications; or listeners of the multiple time-sensitive data streams are connected to different terminals;

wherein the first QoS-related information comprises at least one of the following: a transfer interval, information related to a data sending interval, a first guaranteed bitrate GBR-related parameter, first maximum data burst, first delay budget information, a maximum packet size, a maximum number of packets sent in a data sending interval, packet filter information, or information indicating whether it is time-sensitive; wherein the first delay budget information is delay budget information for the terminal and the RAN network element.

16. The communications device according to claim 15, wherein the determining information related to a data sending interval according to the first information comprises:

determining the information related to the data sending interval according to at least one of the transfer interval, the earliest data sending start time offset within the transfer interval, the latest data sending start time offset within the transfer interval, or the jitter time in the transfer configuration information of the time-sensitive data stream and/or the bridge capability information; and/or wherein the determining the first GBR-related parameter according to the first information comprises:

determining the first GBR-related parameter according to at least one of the transfer interval, the maximum frame size, the maximum number of frames sent within the transfer interval, the earliest data sending start time offset within the transfer interval, the latest data sending start time offset within the transfer interval, or the jitter time in the transfer configuration information of the time-sensitive data stream and the information related to the data sending interval.

17. The communications device according to claim 16, wherein the information related to the data sending interval comprises at least one of the following: an earliest data sending start time within the transfer interval, a latest data sending start time within the transfer interval, a data sending start time within the transfer interval, a data sending end time within the transfer interval, an earliest data sending start time offset within the transfer interval, or a latest data sending start time offset within the transfer interval.

18. The communications device according to claim 15, wherein the determining a first maximum data burst according to the first information comprises:
   determining the maximum data burst according to the maximum frame size and/or the maximum number of frames sent within the transfer interval in the transfer configuration information of the time-sensitive data stream; and/or
   wherein the determining the first delay budget information according to the first information comprises:
   determining delay budget information between the terminal and a RAN network element according to at least one of a confirmed latest data sending time within the transfer interval, a delay between the radio access network RAN network element and an anchor UPF, or a processing delay of the terminal.

19. The communications device according to claim 15, wherein the maximum packet size is the maximum frame size of the time-sensitive data stream; and/or
   wherein the determining packet filter information according to the first information comprises:
   packet filter information of the first QoS stream comprises the data frame specification of the time-sensitive data stream; or
   packet filter information of the first QoS stream is set to the data frame specification of the time-sensitive data stream; and/or
   wherein the determining, according to the first information, indication information indicating whether it is time-sensitive comprises:
   a value of the indication information indicating whether the first QoS stream is time-sensitive is set to time-sensitive.

20. The communications device according to claim 14, wherein the sending the first QoS-related information, the first container information, and/or the transfer configuration information of the time-sensitive data stream to a first target end comprises:
   when establishing or modifying the first QoS stream, sending the first QoS-related information, the first container information, and/or the transfer configuration information of the time-sensitive data stream to the first target end.

* * * * *